(12) United States Patent
Fineberg et al.

(10) Patent No.: US 9,405,680 B2
(45) Date of Patent: Aug. 2, 2016

(54) COMMUNICATION-LINK-ATTACHED PERSISTENT MEMORY SYSTEM

(75) Inventors: Samuel Fineberg, Palo Alto, CA (US); Pankaj Mehra, San Jose, CA (US); Roger Hansen, San Francisco, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 744 days.

(21) Appl. No.: 12/965,457

(22) Filed: Dec. 10, 2010

(65) Prior Publication Data

US 2011/0082992 A1   Apr. 7, 2011

Related U.S. Application Data

(62) Division of application No. 10/808,138, filed on Mar. 24, 2004, now abandoned.

(51) Int. Cl.
G06F 12/02   (2006.01)

(52) U.S. Cl.
CPC .................................. *G06F 12/0284* (2013.01)

(58) Field of Classification Search
None
See application file for complete search history.

(56) References Cited

U.S. PATENT DOCUMENTS

| | | | |
|---|---|---|---|
| 4,590,554 A | 5/1986 | Glazer et al. | |
| 5,179,703 A * | 1/1993 | Evans | 717/122 |
| 5,446,857 A | 8/1995 | Russ | |
| 5,479,628 A * | 12/1995 | Olson et al. | 711/206 |
| 5,721,918 A | 2/1998 | Nilsson et al. | |
| 5,845,082 A | 12/1998 | Murakami | |
| 5,864,657 A | 1/1999 | Stiffler | |
| 5,864,849 A | 1/1999 | Bohannon et al. | |
| 6,044,475 A | 3/2000 | Chung et al. | |
| 6,079,030 A | 6/2000 | Masubuchi | |
| 6,088,773 A | 7/2000 | Kano et al. | |
| 6,105,148 A | 8/2000 | Chung et al. | |
| 6,141,773 A | 10/2000 | St. Pierre et al. | |
| 6,185,702 B1 | 2/2001 | Shirakihara et al. | |
| 6,195,760 B1 | 2/2001 | Chung et al. | |
| 6,266,781 B1 | 7/2001 | Chung et al. | |
| 6,272,607 B1 | 8/2001 | Baentsch et al. | |

(Continued)

FOREIGN PATENT DOCUMENTS

DE   19819205 A1   4/1999

OTHER PUBLICATIONS

Hansen et al., Office Action dated Aug. 23, 2006; U.S. Appl. No. 10/737,374, filed Dec. 16, 2003.

(Continued)

*Primary Examiner* — Daniel Tsui
(74) *Attorney, Agent, or Firm* — Thomas, Kayden, Horstemeyer & Risley

(57) ABSTRACT

A system and method is described that accesses a network persistent memory unit (nPMU). One embodiment comprises a primary region corresponding to a predefined portion of a primary network persistent memory unit (nPMU) communicatively coupled to at least one client processor node via a communication system, wherein the primary region is assigned to a client process running on the client processor node and is configured to store information received from the client process; and a mirror region corresponding to a predefined portion of a mirror nPMU communicatively coupled to the client processor node via the communication system, wherein the mirror region is assigned to the client process and is configured to store the information received from the client process.

23 Claims, 9 Drawing Sheets

(56) References Cited

U.S. PATENT DOCUMENTS

| | | | |
|---|---|---|---|
| 6,374,264 | B1 | 4/2002 | Bohannon et al. |
| 6,477,617 | B1 | 11/2002 | Golding |
| 6,493,837 | B1 | 12/2002 | Pang |
| 6,622,263 | B1 | 9/2003 | Stiffler et al. |
| 6,678,704 | B1 | 1/2004 | Bridge et al. |
| 6,691,245 | B1 | 2/2004 | DeKoning |
| 6,704,831 | B1 | 3/2004 | Avery |
| 6,721,806 | B2 | 4/2004 | Boyd et al. |
| 6,823,474 | B2 | 11/2004 | Kampe et al. |
| 6,883,068 | B2 | 4/2005 | Tsirigotis et al. |
| 6,957,237 | B1 | 10/2005 | Traversat et al. |
| 7,082,553 | B1 | 7/2006 | Wang |
| 7,165,186 | B1 | 1/2007 | Viswanatham et al. |
| 7,251,713 | B1 | 7/2007 | Zhang |
| 7,251,747 | B1 | 7/2007 | Bean et al. |
| 7,266,645 | B2 * | 9/2007 | Garg et al. ............. 711/133 |
| 7,386,694 | B1 * | 6/2008 | Bezbaruah et al. ....... 711/162 |
| 7,418,626 | B2 | 8/2008 | Aino et al. |
| 2002/0032691 | A1 | 3/2002 | Rabii et al. |
| 2002/0032883 | A1 | 3/2002 | Kampe et al. |
| 2002/0073325 | A1 | 6/2002 | Ho et al. |
| 2002/0087916 | A1 | 7/2002 | Meth |
| 2002/0103819 | A1 | 8/2002 | Duvillier et al. |
| 2002/0120791 | A1 | 8/2002 | Somalwar et al. |
| 2002/0124117 | A1 | 9/2002 | Beukema et al. |
| 2002/0184398 | A1 | 12/2002 | Orenshteyn |
| 2003/0009477 | A1 | 1/2003 | Wilding et al. |
| 2003/0093627 | A1 | 5/2003 | Neal et al. |
| 2003/0120864 | A1 | 6/2003 | Lee et al. |
| 2003/0131039 | A1 | 7/2003 | Bajoria |
| 2004/0025052 | A1 | 2/2004 | Dickenson |
| 2004/0034814 | A1 | 2/2004 | Thompson |
| 2004/0037319 | A1 | 2/2004 | Pandya |
| 2004/0049580 | A1 | 3/2004 | Boyd et al. |
| 2004/0049600 | A1 | 3/2004 | Boyd et al. |
| 2004/0049774 | A1 | 3/2004 | Boyd et al. |
| 2004/0148360 | A1 | 7/2004 | Mehra et al. |
| 2004/0199924 | A1 | 10/2004 | Ganesh et al. |
| 2004/0230862 | A1 | 11/2004 | Merchant et al. |
| 2004/0260726 | A1 | 12/2004 | Hrle et al. |
| 2005/0129039 | A1 | 6/2005 | Biran et al. |
| 2005/0138461 | A1 | 6/2005 | Allen et al. |
| 2005/0144310 | A1 | 6/2005 | Biran et al. |
| 2005/0188165 | A1 * | 8/2005 | Wolfgang et al. ......... 711/162 |
| 2005/0203974 | A1 | 9/2005 | Smith et al. |
| 2005/0251785 | A1 | 11/2005 | Vertes et al. |
| 2006/0195672 | A1 * | 8/2006 | Inoue et al. .............. 711/170 |

OTHER PUBLICATIONS

Hansen et al., Amendment/Response to Office Action dated Aug. 23, 2006 filed Nov. 20, 2006; U.S. Appl. No. 10/737,374, filed Dec. 16, 2003.

Hansen et al., Amendment/Response to Office Action dated Aug. 23, 2006 filed Nov. 22, 2006; U.S. Appl. No. 10/737,374, filed Dec. 16, 2003.

Hansen et al., Office Action dated Feb. 8, 2007; U.S. Appl. No. 10/737,374, filed Dec. 16, 2003.

Hansen et al., Amendment/Response to Office Action dated Feb. 8, 2007 filed Jun. 8, 2007; U.S. Appl. No. 10/737,374, filed Dec. 16, 2003.

Hansen et al., Final Office Action dated Oct. 31, 2007; U.S. Appl. No. 10/737,374, filed Dec. 16, 2003.

Hansen et al., Amendment/Response to Final Office Action dated Oct. 31, 2007 filed Dec. 29, 2007; U.S. Appl. No. 10/737,374, filed Dec. 16, 2003.

Hansen et al., Office Action dated Mar. 17, 2008; U.S. Appl. No. 10/737,374, filed Dec. 16, 2003.

Hansen et al., Amendment/Response to Office Action Mar. 17, 2008 filed Jun. 16, 2008; U.S. Appl. No. 10/737,374, filed Dec. 16, 2003.

Hansen et al., Final Office Action dated Sep. 22, 2008; U.S. Appl. No. 10/737,374, filed Dec. 16, 2003.

Hansen et al., Amendment/Response to Final Office Action Sep. 22, 2008 filed Dec. 15, 2008; U.S. Appl. No. 10/737,374, filed Dec. 16, 2003.

Hansen et al., Office Action dated Mar. 9, 2009; U.S. Appl. No. 10/737,374, filed Dec. 16, 2003.

Hansen et al., Amendment/Response to Office Action Mar. 9, 2009 filed Jun. 8, 2009; U.S. Appl. No. 10/737,374, filed Dec. 16, 2003.

Hansen et al., Final Office Action dated Oct. 1, 2009; U.S. Appl. No. 10/737,374, filed Dec. 16, 2003.

Hansen et al., Amendment/Response to Final Office Action Oct. 1, 2009 filed Nov. 30, 2009; U.S. Appl. No. 10/737,374, filed Dec. 16, 2003.

Hansen et al., Ex Parte Quayle Action Dec. 30, 2009; U.S. Appl. No. 10/737,374, filed Dec. 16, 2003.

Fineberg et al., Office Action dated Sep. 19, 2007; U.S. Appl. No. 10/808,138, filed Mar. 24, 2004.

Fineberg et al., Response to Office Action dated Sep. 19, 2007 filed Nov. 28, 2007: U.S. Appl. No. 10/808,138, filed Mar. 24, 2004.

Fineberg et al., Final Office Action dated Feb. 26, 2008; U.S. Appl. No. 10/808,138, filed Mar. 24, 2004.

Fineberg et al., Notice of Appeal and Appeal Brief filed Apr. 17, 2008; U.S. Appl. No. 10/808,138, filed Mar. 24, 2004.

Fineberg et al., Examiner's Answer dated Jul. 11, 2008; U.S. Appl. No. 10/808,138, filed Mar. 24, 2004.

Fineberg et al., Reply Brief filed Aug. 28, 2008; U.S. Appl. No. 10/808,138, filed Mar. 24, 2004.

Fineberg et al., Decision on Appeal dated Nov. 8, 2008; U.S. Appl. No. 10/808,138, filed Mar. 24, 2004.

Google patents checkpoint "direct memory." [Online] http://www.google.com/patents?as_q=checkpoint&num=100&btnG=Google%20Search&a...

"The Authoritative Dictionary of IEEE Standards Terms," 200, IEEE, 7th Edition, p. 46.

Romanow, A., and Bailey, S., An Overview of RDMA over IP. The Internet Society, 2002. Retrieved from the Internet: <URL: http://datatag.web.cern.ch/datatag/pfldnet2003/papers/romanow.pdf>, 22 p.

* cited by examiner

COMMUNICATION-LINK-ATTACHED PERSISTENT MEMORY SYSTEM

CROSS REFERENCE TO RELATED APPLICATIONS

This application claims priority to, and is a divisional of, U.S. application Ser. No. 10/808,138, filed Mar. 24, 2004, entitled "Communication-Link-Attached Persistent Memory System", which application is incorporated by reference herein as if reproduced in full below.

BACKGROUND

Traditionally, computers have stored their data in either memory or on other input/output (I/O) storage devices such as magnetic tape or disk. I/O storage devices can be attached to a system through an I/O bus such as a PCI (originally named Peripheral Component Interconnect), or through a network such as Fiber Channel, Infiniband, ServerNet, or Ethernet. I/O storage devices are typically slow, with access times of more than one millisecond. They utilize special I/O protocols such as small computer systems interface (SCSI) protocol or transmission control protocol/internet protocol (TCP/IP), and they typically operate as block exchange devices (e.g., data is read or written in fixed size blocks of data). A feature of these types of storage I/O devices is that they are persistent such that when they lose power or are re-started they retain the information stored on them previously. In addition, networked I/O storage devices can be accessed from multiple processors through shared I/O networks, even after some processors have failed.

System memory is generally connected to a processor through a system bus where such memory is relatively fast with guaranteed access times measured in tens of nanoseconds. Moreover, system memory can be directly accessed with byte-level granularity. System memory, however, is normally volatile such that its contents are lost if power is lost or if a system embodying such memory is restarted. Also, system memory is usually within the same fault domain as a processor such that if a processor fails the attached memory also fails and may no longer be accessed.

Therefore, it is desirable to have an alternative to these technologies which provides the persistence and durability of storage I/O with the speed and byte-grained access of system memory. Further, it is desirable to have a remote direct memory access (RDMA) capable network in order to allow a plurality of client processes operating on multiple processors to share memory, and therefore provide the fault-tolerance characteristics of networked RDMA memory.

Prior art systems have used battery-backed dynamic random access memory (BBDRAM), solid-state disks, and network-attached volatile memory. Prior direct-attached BBDRAM, for example, may have some performance advantages over true persistent memory. However, they are not globally accessible, so that the direct-attached BBDRAM lies within the same fault domain as an attached CPU. Therefore, direct-attached BBDRAM will be rendered inaccessible in the event of a CPU failure or operating system crash. Accordingly, direct-attached BBDRAM is often used in situations where all system memory is persistent so that the system may be restarted quickly after a power failure or reboot. BBDRAM is still volatile during long power outages such that alternate means must be provided to store its contents before batteries drain. RDMA attachment of BBDRAM is not known to exist. Importantly, this use of direct-attached BBDRAM is very restrictive and not amenable for use in network-attached persistent memory applications, for example.

Battery-backed solid-state disks (BBSSDs) have been proposed for other implementations. These BBSSDs provide persistent memory, but functionally they emulate a disk drive. An important disadvantage of this approach is the additional latency associated with access to these devices through I/O adapters. This latency is inherent in the block-oriented and file-oriented storage models used by disks and, in turn, BBSSDs. They run through a sub-optimal data path wherein the operating system is not bypassed. While it is possible to modify solid-state disks to eliminate some shortcomings, inherent latency cannot be eliminated because performance is limited by the I/O protocols and their associated device drivers. As with direct-attached BBDRAM, additional technologies are required for dealing with loss of power for extended periods of time.

It is therefore desirable to provide memory that is persistent (not volatile) either through extended periods of power loss or past an operating system crash. Moreover, it is desirable to locate all or part of such memory remotely (i.e., outside the fault domain of failing processors) so that it is robust to processor failures. It is further desirable to provide (remote) access to such persistent memory over a system area network (SAN) where it can be efficiently accessed by many processors, although not necessarily at the same time. With such persistent memory, improved computer systems can be implemented.

SUMMARY

A system and method is described that accesses a network persistent memory unit (nPMU). One embodiment comprises a primary region corresponding to a predefined portion of a primary network persistent memory unit (nPMU) communicatively coupled to at least one client processor node via a communication system, wherein the primary region is assigned to a client process running on the client node and is configured to store information received from the client process; and a mirror region corresponding to a predefined portion of a mirror nPMU communicatively coupled to the client processor node via the communication system, wherein the mirror region is assigned to the client process and is configured to store the information received from the client process.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of embodiments of the invention. Moreover, in the drawings, like reference numerals designate corresponding parts throughout the several views.

DETAILED DESCRIPTION OF THE PREFERRED EMBODIMENTS

Figure 1:
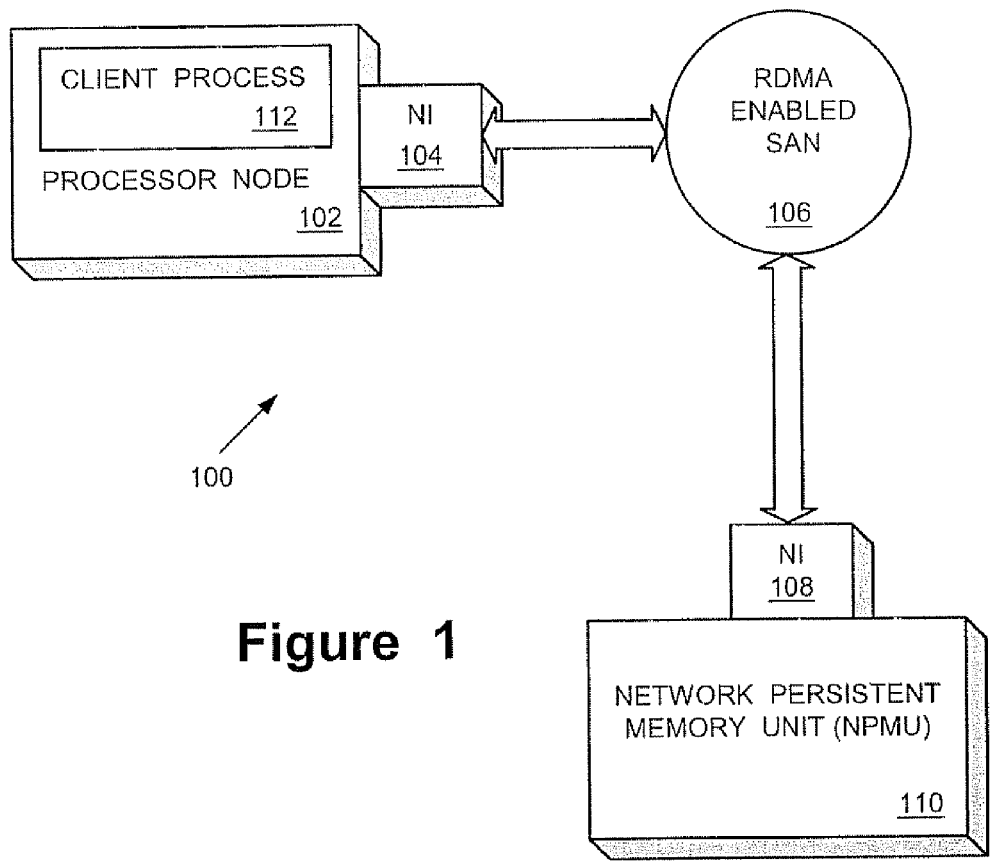
FIG. 1 is a block diagram of a system that includes a network attached persistent memory unit (nPMU).

The present disclosure describes a persistent memory device that combines the durability and recoverability of storage I/O with the speed and fine-grained access of system memory. Like storage, its contents can survive the loss of power or system restart. Like remote memory, it is accessed across a system area network (SAN). However, unlike directly-connected memory, the device can continue to be accessed even after a processor accessing it has failed.

Remote Direct Memory Access (RDMA) is a key capability that distinguishes SANs from other classes of networks; it supports continuous-use memory semantics even when the memory is remotely located (i.e., not directly connected to the processor). SANs are therefore also known as RDMA-enabled networks. They characteristically allow fast zero-copy memory operations at byte granularity.

Network-attached persistent memory devices require disk-like persistence characteristics where the contents of the memory must survive not only power failures but also operating system crashes, other software failures, hardware or software upgrades, and system maintenance reboots. The present teachings are unique in their use of persistent (or non-volatile) memory, which places very different sets of design and implementation constraints compared to volatile memory. For instance, the management of meta-data (that is, data on the state of memory) as well as the management of information for translating from virtual to physical addresses is quite different in the two cases. Moreover, the present teachings are unique in their attachment of persistent memory to an RDMA-enabled network.

In one embodiment described in greater detail herein, a system includes a network attached persistent memory unit (nPMU). The system includes a processor node for initiating memory operations such as read and write operations. The processor unit references its address operations relative to a virtual address space that corresponds to a persistent memory address space. The processor node further includes a network interface used to communicate to the nPMU wherein the nPMU has its own network interface. Accordingly, the processor node and the persistent memory unit communicate over a communication link such as a network and preferably a system area network. The persistent memory unit is further configured to translate between the virtual address space known to the processor nodes and a physical address space known only to the nPMU. In other embodiments multiple address spaces are provided wherein the nPMU also provides translation from these multiple address spaces to physical address spaces.

In other embodiments, the translation from persistent memory virtual addresses to persistent memory physical addresses occurs within the respective processor nodes. In yet other embodiments, that translation occurs within either the links, ports, switches, routers, bridges, firmware, software or services associated with the SAN. The present teachings only assume that the mapping information required for such translation be maintained consistent with the data stored in a nPMU, that some entity can efficiently carry out address translation using the stored mapping information, and that the entity and the required mapping information will be available any time information needs to be recovered from the nPMU.

In yet other embodiments, other types of networks are used such as ServerNet, GigaNet, Infiniband, Peripheral Component Interconnect (PCI) Express, RDMA-enabled Ethernet, and Virtual Interface Architecture (VIA) networks. Moreover, various types of persistent memory are used such as magnetic random access memory (MRAM), magneto-resistive random access memory (MRRAM), polymer ferroelectric random access memory (PFRAM), ovonics unified memory (OUM), and FLASH memory.

The present teachings describe memory that is persistent like traditional I/O storage devices, but that can be accessed like system memory with fine granularity and low latency. As shown in FIG. 1, a persistent memory system 100 using network attached persistent memory consists of a network-attached persistent memory unit (nPMU) 110 that can be accessed by one or more processor nodes 102 through an RDMA-enabled system area network (SAN) 106. In order to access the persistent memory of nPMU 110, a client process 112 (such as executing software or the like) running on the processor node 102 initiates remote read or write operations through the processor node's network interface (NI) 104. In this manner, read or write commands are carried on RDMA-enabled SAN 106 to the nPMU's network interface (NI) 108. Accordingly, after processing, the appropriate data is communicated over the RDMA-enabled SAN 106. In addition to RDMA data movement operations, nPMU 110 can be configured to respond to various management commands to be described below. In a write operation initiated by processor node 102, for example, once data have been successfully stored in the nPMU, they are durable and will survive a power outage or processor node 102 failure. In particular, memory contents will be maintained as long as the nPMU 110 continues to function correctly, even after the power has been disconnected for an extended period of time, or the operating system on processor node 102 has been rebooted.

In this embodiment, processor node 102 is a computer system consisting of at least one central processing unit (CPU) and memory wherein the CPU is configured to run an operating system. Processor node 102 is additionally configured to run application software such as databases. Processor node 102 uses SAN 106 to communicate with other processor nodes 102 as well as with devices such as nPMU 110 and I/O controllers (not shown).

In one implementation of this embodiment, an RDMA-enabled SAN 106 is a network capable of performing byte-level memory operations such as copy operations between two processor nodes, or between a processor node and a device, without notifying the CPU of processor node 102. In this case, SAN 106 is configured to perform virtual to physical address translation in order to enable the mapping of contiguous network virtual address spaces onto discontiguous physical address spaces. This type of address translation allows for dynamic management of nPMU 110. Commercially available SANs 106 with RDMA capability include, but are not limited to, ServerNet, GigaNet, Infiniband, and Virtual Interface Architecture compliant SANs.

Processor nodes 102 are generally attached to a SAN 106 through the NI 104, however, many variations are possible. More generally, however, a processor node need only be connected to an apparatus for communicating read and write operations. For example, in another implementation of this embodiment, processor nodes 102 are various CPUs on a motherboard and, instead of using a SAN, a data bus is used, for example a PCI bus. It is noted that the present teachings can be scaled up or down to accommodate larger or smaller implementations as needed.

Network interface (NI) 108 is communicatively coupled to nPMU 110 to allow for access to the persistent memory contained with nPMU 110. Many technologies are available for the various components of FIG. 1, including the type of persistent memory. Accordingly, the embodiment of FIG. 1 is not limited to a specific technology for realizing the persistent memory. Indeed, multiple memory technologies, including magnetic random access memory (MRAM), magneto-resistive random access memory (MRRAM), polymer ferroelectric random access memory (PFRAM), ovonics unified memory (OUM), battery-backed dynamic random access memory (BBDRAM), and FLASH memories of all kinds are appropriate. Whereas battery-backed solid-state disks (BB-SSDs) have been performing block level transfers, this approach allows for finer granularity of memory access, including byte-level memory access. Notably, memory access granularity can be made finer or coarser using various embodiments. Where SAN 106 is used, memory access should be fast enough to support RDMA access. In this way, RDMA read and write operations are made possible over SAN 106. Where another type of communication apparatus is used, the access speed of the memory used should also be fast enough to accommodate the communication apparatus. It should be noted that persistent information is provided to the extent the persistent memory in use may hold data. For example, in one embodiment, persistent memory stores data regardless of the amount of time power is lost; whereas in another embodiment, persistent memory stores data for a few minutes or hours.

In conjunction with this approach, memory management functionality is provided for creating single or multiple independent, indirectly-addressed memory regions. Moreover, nPMU meta-data is provided for memory recovery after loss of power or processor failure. Meta information includes, for example, the contents and the layout of the protected memory regions within an nPMU 110. In this way, the nPMU 110 stores the data and the manner of using the data. When the need arises, the nPMU 110 can then allow for recovery from a power or system failure.

Figure 2:
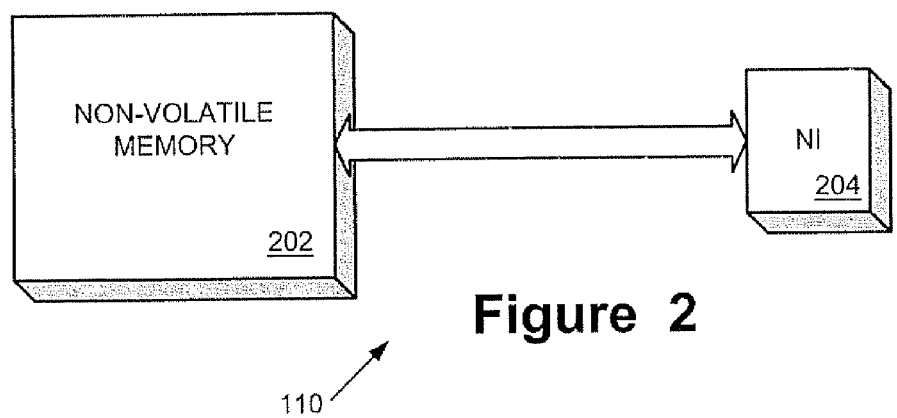
FIG. 2 is a block diagram of an embodiment of a network attached persistent memory unit (nPMU).

Shown in FIG. 2 is a simple embodiment of nPMU 110 that uses non-volatile memory 202 communicatively coupled to NI 204 via a communications link such as a bus. Here, non-volatile memory 202 can be, for example, MRAM or Flash memory. NI 204 does not initiate its own RDMA requests, but instead NI 204 receives commands from the network and carries out the requested operations. Specifically, nPMU 110 translates the address on incoming requests and then carries out the requested operation. Further details on command processing will be discussed below.

Figure 3:
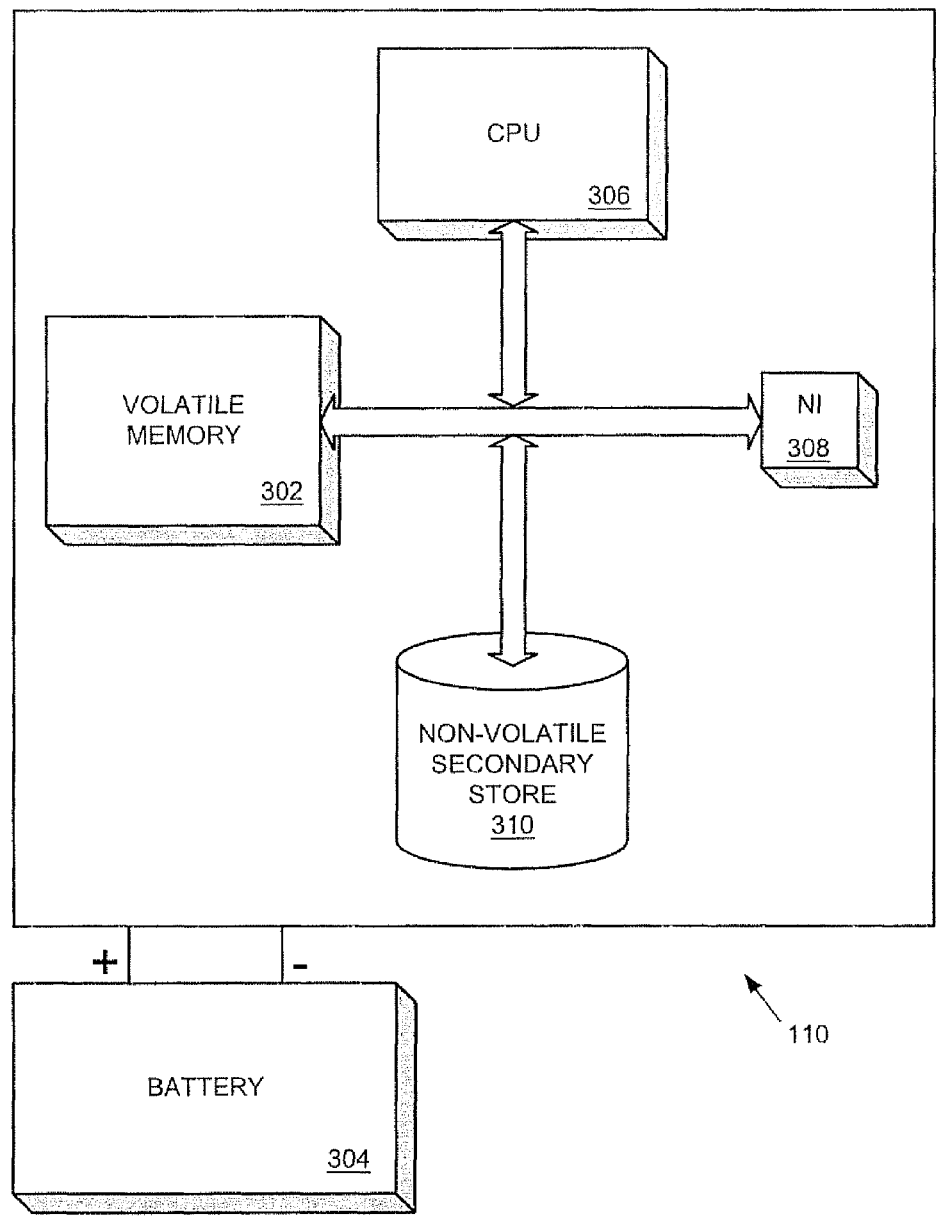
FIG. 3 is a block diagram of an embodiment of a network attached persistent memory unit (nPMU) using battery backup.

Shown in FIG. 3 is a relatively more complex embodiment of nPMU 110 using a combination of volatile memory 302 with battery 304 and a non-volatile secondary store 310. In this embodiment, when power fails, the data within volatile memory 302 is preserved using the power of battery 304 until such data can be saved to non-volatile secondary store 310. Non-volatile secondary store 310 can be, for example, a magnetic disk or slow FLASH memory. For nPMU 110 (FIG. 1) to operate properly, the transfer of data from volatile memory 302 to non-volatile secondary memory store 310 should occur without external intervention or any further power other than that from battery 304. Accordingly, any required tasks should be completed before battery 304 can discharge. As shown, nPMU 110 includes optional CPU 306 running an embedded operating system. Accordingly, the backup task (i.e., data transfer from volatile memory 302 to non-volatile secondary memory store 310) can be performed by software running on CPU 306. NI 308 is also included to initiate RDMA requests under the control of software running on CPU 306. Here again, CPU 306 receives management commands from the network and carries out the requested management operation.

Embodiments of an nPMU 110 has to be a managed entity in order to facilitate resource allocation and sharing. In this embodiment, nPMU management is carried out by a persistent memory manager (PMM). The PMM can be located within the nPMU or outside the nPMU such as on one of the previously described processor nodes. When a processor node needs to allocate or de-allocate persistent memory of the nPMU, or when it needs to use an existing region of persistent memory, the processor node first communicates with the PMM to perform requested management tasks. Note that because an nPMU is durable (like a disk), and because the nPMU maintains a self-describing body of persistent data, meta-data related to existing persistent memory regions must be stored on the nPMU device itself. The PMM must therefore perform management tasks in a manner that will always keep the meta-data on the nPMU consistent with the persistent data stored on the nPMU, so that the nPMU's stored data can always be interpreted using the nPMU's stored meta-data and thereby recovered after a possible system shutdown or failure. In this way, an nPMU maintains in a persistent manner not only the data being manipulated but also the state of the processing of such data. Upon a need for recovery, the persistent memory system 100 (FIG. 1) using an nPMU 110 is thus able to recover and continue operation from the memory state in which a power failure or operating system crash occurred.

Figure 4:
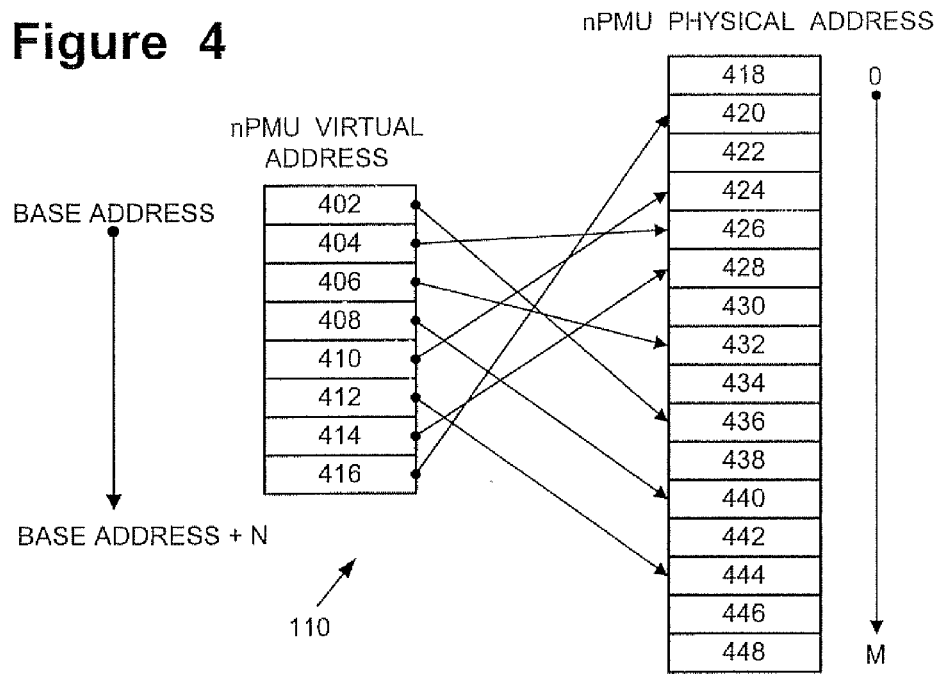
FIG. 4 is a block diagram illustrating mappings from a persistent memory virtual address space to a persistent memory physical address space.

As described with reference to FIG. 1, SAN 106 provides basic memory management and virtual memory support. In such an implementation, the PMM must be able to program the logic in NI 108 of nPMU 110 in order to enable remote read and write operations, while simultaneously protecting the persistent memory of the nPMU 110 from unauthorized or inadvertent accesses by all except a select set of entities on SAN 106. Moreover, as shown in FIG. 4, an nPMU can support virtual-to-physical address translation. For example, a continuous virtual address space such as persistent memory (PM) virtual addresses 402 through 416 can be mapped or translated to discontinuous persistent memory physical addresses 418-448. The nPMU network virtual addresses are referenced relative to a base address through N incremental address. Such nPMU network virtual addresses, however, correspond to discontiguous nPMU physical addresses. As shown, nPMU network virtual address 402 can actually correspond to a nPMU physical address 436. Accordingly, the nPMU must be able to provide the appropriate translation from the nPMU network virtual address space to the nPMU physical address space. In this way, the translation mechanism allows the nPMU to present contiguous virtual address ranges to processor nodes, while still allowing dynamic management of the nPMUs physical memory. This is particularly important because of the persistent nature of the data on an nPMU. Due to configuration changes, the number of processes accessing a particular nPMU, or possibly the sizes of their respective allocations, may change over time. The address translation mechanism allows the nPMU to readily accommodate such changes without loss of data. The address translation mechanism further allows easy and efficient use of persistent memory capacity by neither forcing the processor nodes to anticipate future memory needs in advance of allocation nor forcing the processor nodes to waste persistent memory capacity through pessimistic allocation.

With reference back to FIG. 1, a ServerNet SAN operating in its native access validation and translation/block transfer engine (AVT/BTE) mode is an example of a single-address space SAN 106. Each target on such SAN presents the same, flat network virtual address space to all of its RDMA-request initiators, such as processor nodes 102. Network virtual address ranges are mapped by the target from nPMU network virtual address to nPMU physical address ranges with page granularity. Network nPMU network virtual address ranges can be exclusively allocated to a single initiator (e.g., processor node 102) or to multiple initiators (e.g., the processors running a client's primary and backup processes). One embodiment is subject to the constraints of ServerNet's AVT entry protection. When this is not possible, or when initiators need different access rights, multiple nPMU network virtual addresses can point to the same physical page.

When client process 112 operating on processor node 102 requests the PMM to open (i.e., begin to use) a region of persistent memory in an nPMU, the nPMU's NI 108 is programmed by the PMM to allow the processor node 102 running the client process 112 to access the appropriate region. This programming allocates a block of network virtual addresses and maps (i.e., translates) them to a set of physical pages in physical memory. The range of nPMU network virtual addresses can then be contiguous, regardless of where they reside within the PM's physical memory. Upon successful set-up of the translation, the PMM notifies the requesting processor node 102 of the nPMU network virtual address where the contiguous block has been mapped. Once open, processor node 102 can access nPMU memory pages by issuing RDMA read or write operations to the nPMU at network virtual addresses within the mapped range. When all of the client process on a processor node 102 have completed using the open region, the mapping is removed and the nPMU network virtual addresses may be re-used for future region mappings. Note that this does not mean that the region itself is no longer in use. Instead, it may still be open by one or more processes residing on another processor (or even the same one), but with a different nPMU network virtual address mapping.

Figure 5:
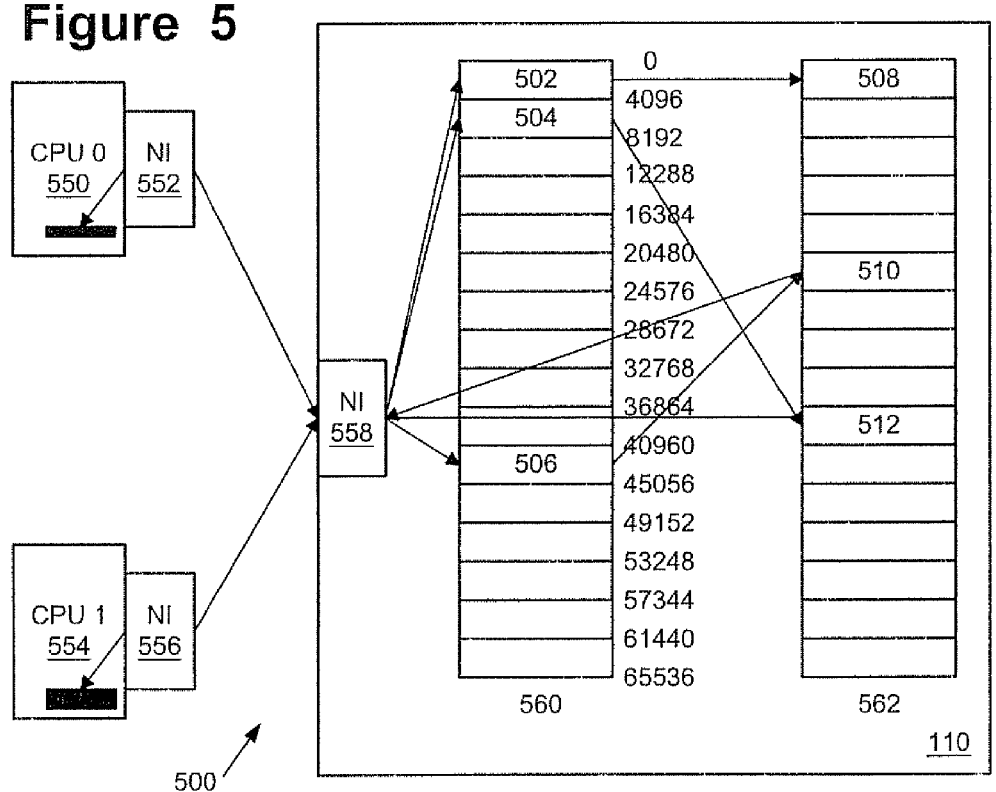
FIG. 5 is a block diagram of an embodiment of a network attached persistent memory unit (nPMU) having one persistent memory virtual address space.

With reference now to FIG. 5, nPMU 110 operations will be described in the context of a single virtual address space. Shown is a single nPMU network virtual address space 560 that translates to a nPMU physical address space 562. Once a range of persistent memory is open, CPU 0 550 can access such range of persistent memory in conjunction with the operation of NI 552 and NI 558. The PMM opens a range of persistent memory by making available to a CPU a range of virtual addresses. In requesting access to an open range of nPMU network virtual address space, CPU 0 550 passes a command (e.g., read or write) through NI 552 to NI 558. In one embodiment operation, only CPU 0 550 can access a specified range of nPMU network virtual addresses. In other embodiments, a range of nPMU network virtual addresses may be shared by two or more CPUs, or they may be restricted to only a subset of the processes on one or more CPUs. Accordingly, as part of its PMM-configured functionality, the NI 558 first validates the ability of CPU 0 550 to target the requested nPMU network virtual address 560. If within the allowed range of CPU 0 550, NI 558 then performs the requisite address translation, and finally performs the requested operation (e.g., read or write) against the nPMU physical address 562.

Figure 6:
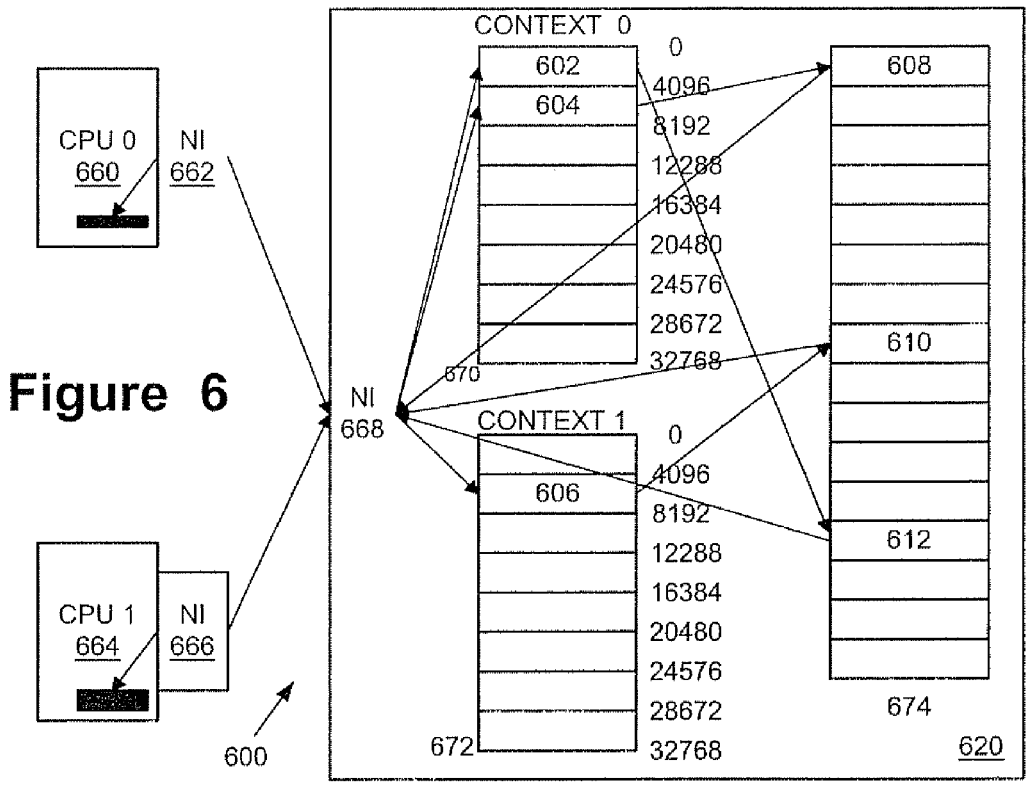
FIG. 6 is a block diagram of an embodiment of a network attached persistent memory unit (nPMU) having multiple persistent memory virtual address spaces.

As shown in FIG. 6, nPMU 620 can also accommodate multiple virtual address contexts (spaces) 670 and 672 with their respective nPMU network virtual address spaces and translates each space independently into the nPMU physical address space 674. SANs that implement multiple address spaces include VI Architecture (VIA) SANs, which in turn include GigaNet and ServerNet II (in VIA mode), as well as Infiniband. There are similarities between nPMU 620 of FIG. 6 and nPMU 110 of FIG. 5. In nPMU 620, however, an nPMU 620 or more specifically an nPMU's NI 668 needs to discern first among the multiple virtual address contexts 670 and 672 and then translate the virtual address contexts 670 and 672 to the appropriate nPMU physical address 674.

The NI 668 in this embodiment provides the process-equivalent virtual addresses. Accordingly, the NI 668 is designed for user-mode as well as kernel-mode access to nPMU virtual memory and, in turn, nPMU physical memory. Many independent network virtual address spaces can be made available using different address contexts. Whereas only two address contexts are shown, many more are possible. In fact, to the extent that the present is applicable in internet applications, many thousands of address contexts are possible. To specify a particular address space, an RDMA command (e.g., read or write) specifies a context identifier along with the desired virtual address. NI 668 can therefore accommodate various processor nodes (e.g., CPU 0 660 and CPU 1 664) to share the same context identifier. Moreover, separate virtual pages from different contexts can translate to the same physical memory page.

As before, when a client process 112 (FIG. 1) opens a region of persistent memory for access, NI 668 is programmed by its PMM after the PMM verifies that the requesting processor node has access to the region. Then, as before, the PMM programs the NI 668. However, in this case the programming now creates a context in the NI 668. The context includes a block of network virtual addresses that are translated to a set of physical pages. However, unlike the case outlined in FIG. 5, these virtual addresses are only valid within the new context, which must be identified as part of any network operation. For example, nPMU network virtual address 602 of context 0 670 translates to nPMU physical address 612; and nPMU network virtual address 606 of context 1 672 translates to nPMU physical address 610. As before, the nPMU network virtual addresses are contiguous regardless of the number of nPMU physical pages allocated. The physical pages, however, can be located anywhere within the nPMU physical memory.

The further functionality of the present approach as shown, for example, in FIG. 1 can now be understood. For example, once processor node 102 has communicated with the PMM to open a memory region, it can then directly access the memory of nPMU 110 without again going through the PMM. For example, a remote read command, described in greater detail hereinbelow, provides a starting network virtual address and offset as well as a context identifier (in the case of multiple address spaces). For proper operation, this address range should be within the range allocated by the PMM. Processor node 102 provides to NI 104 a remote read command containing a pointer to a local physical memory location at node 102. NI 104 in the requesting processor node 102 then transmits the remote read command to NI 108 of nPMU 110 via SAN 106. NI 108 translates the starting network virtual address to a physical address within nPMU 110 using translation table entries associated with the region. By means of NI 108, nPMU 110 then returns data to the reading processor node starting at the translated physical address. NI 108 continues translating addresses even if the read crosses page boundaries because the address translation hardware makes the virtual page addresses appear contiguous. When the read command is completed, NI 104 marks the read transfer as completed. Moreover, any waiting processes can be notified and, in turn, processed.

A remote write, described in greater detail hereinbelow, to persistent memory is similar. Processor node 102 provides a starting PM network virtual address and offset as well as a context identifier (in the case of multiple address spaces) for nPMU 110. As before, the PM network virtual address range must fall within the allocated range. Processor node 102 also provides a pointer to the physical address of the data to be transmitted. NI 104 in processor node 102 then issues a remote write command to NI 108 in nPMU 110 and begins sending data. NI 108 translates the start address to a physical address in nPMU 110 using translation table entries associated with the region. Also, nPMU 110 stores data starting at the translated physical address. NI 108 continues translating addresses even if the write crosses page boundaries because the address translation hardware makes the virtual pages appear contiguous. When the write command is completed, NI 104 marks the write transfer as completed. Any waiting processes can then be notified and, in turn, processed.

It should be noted that in latency testing of the nPMU according to the present teachings, it was found that memory accesses could be achieved well within 80 microseconds which compares very favorably to I/O operations requiring over 800 microseconds. Indeed this result is possible because the latencies of I/O operations are avoided. The nPMU according to the present teachings therefore has the persistence of storage with the fine-grained access of system memory.

Various applications exist for nPMUs including applications to accelerate disk reads and writes. Also, nPMUs can facilitate recovery from a power or processor failure. Because of the inherent differences between read and write operations, nPMUs provide a more significant improvement in write operations than in read operations since nPMUs use slower and smaller memory across a network than system RAM over a much faster bus. Whereas, data structures that are to be read frequently may be cached in system RAM, even if a copy exists in nPMU, less often used data structures are appropriate for an nPMU.

For example, database locks held on a transaction-by-transaction basis are appropriate for storage in an nPMU. By tracking updated locks held by transactions in an nPMU, recovery from unplanned outages (and/or perhaps planned transaction manager shutdowns) can be accelerated. Moreover, an nPMU can facilitate the advent of new lock types that persist across failure, thereby guarding the database resources left in an inconsistent state by transactions in process at the time of a crash.

A physical redo cache is also appropriate for an nPMU implementation. Maintaining a cache of database blocks dirtied (that is partially processed), but not flushed before the second-to-last control point, speeds physical redo during volume recovery using fuzzy checkpointing. In an implementation, such a cache is pruned as each control point progresses. During recovery, instead of reading disk volumes, often randomly, for data associated with redo records in an audit trail, by consulting the redo cache in an nPMU, recovery can be achieved much faster. This can be especially important when database caches are large and transactions are relatively small yet occurring at a high rate. In such scenarios, a large amount of audit information can build up between successive control points that can, nonetheless, be stored in an nPMU for expedited recovery.

An nPMU can also provide for efficient database commits through the use of persistent log tail. For example, instead of waiting for disk write operations corresponding to auxiliary audit trails to flush before committing database transactions, an nPMU can allow for database commits upon writing to the nPMU and not having to wait for other flushing operations. Since an nPMU can have better than 10 times lower latency than disk storage, database transaction latencies can be significantly shortened. Moreover, transaction throughput is likewise improved. For example, to the extent information must nonetheless be committed to a disk, an nPMU can accumulate a significantly larger amount of information and, in turn, more efficiently write it to the disk.

Database queues and event processing can also be improved through the use of an nPMU. For example, queues and events can be maintained using list data structures in an nPMU in order to avoid any failures or stalls in inter-enterprise or enterprise-wide deployments. Maintaining events and queues in an nPMU enables smooth workflow processing and timely handling of events, even when a CPU that is actively processing information encounters a failure.

Figure 7:
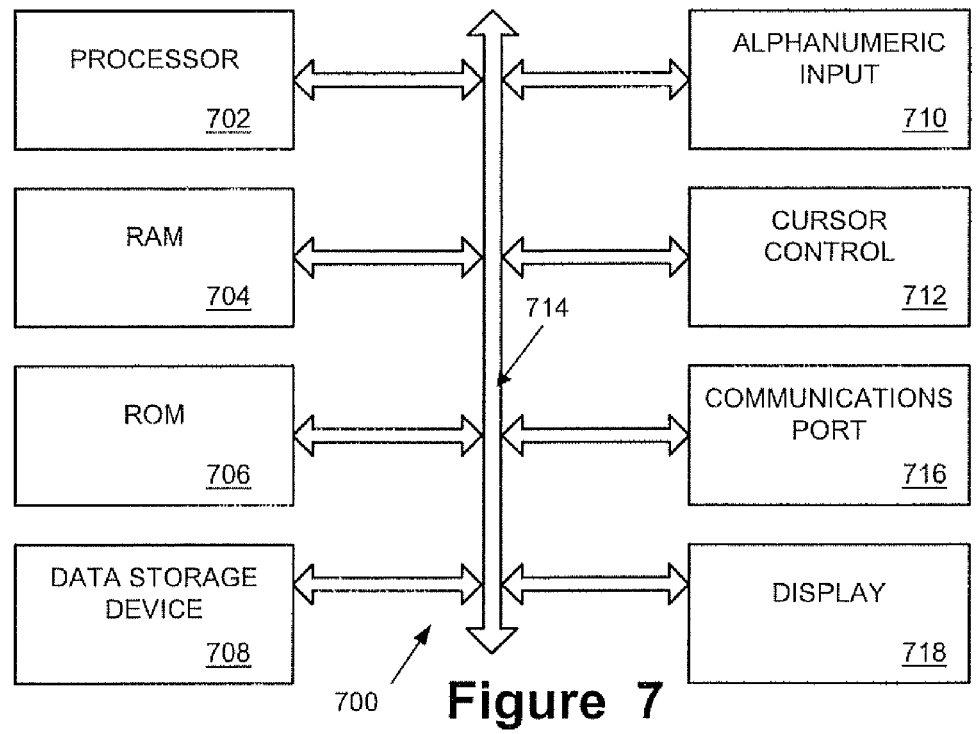
FIG. 7 is a block diagram of an illustrative computer system on which a network attached persistent memory unit (nPMU) is implemented.

In one embodiment, the present approach is practiced on a computer system 700 as shown in FIG. 7. Referring to FIG. 7, an exemplary computer system 700 (e.g., personal computer, workstation, mainframe, etc.) upon which the present teachings may be practiced is shown. Computer system 700 is configured with a data bus 714 that communicatively couples various components. As shown in FIG. 7, processor 702 is coupled to bus 714 for processing information and instructions. A computer readable volatile memory such as RAM 704 is also coupled to bus 714 for storing information and instructions for the processor 702. Moreover, computer-readable read only memory (ROM) 706 is also coupled to bus 714 for storing static information and instructions for processor 702. A data storage device 708 such as a magnetic or optical disk media is also coupled to bus 714. Data storage device 708 is used for storing large amounts of information and instructions. An alphanumeric input device 710 including alphanumeric and function keys is coupled to bus 714 for communicating information and command selections to the processor 702. A cursor control device 712 such as a mouse is coupled to bus 714 for communicating user input information and command selections to the central processor 702. Input/output communications port 716 is coupled to bus 714 for communicating with a network, other computers, or other processors, for example. Display 718 is coupled to bus 714 for displaying information to a computer user. Display device 718 may be a liquid crystal device, cathode ray tube, or other display device suitable for creating graphic images and alphanumeric characters recognizable by the user. The alphanumeric input 710 and cursor control device 712 allow the computer user to dynamically signal the two dimensional movement of a visible symbol (pointer) on display 718.

Figure 8:
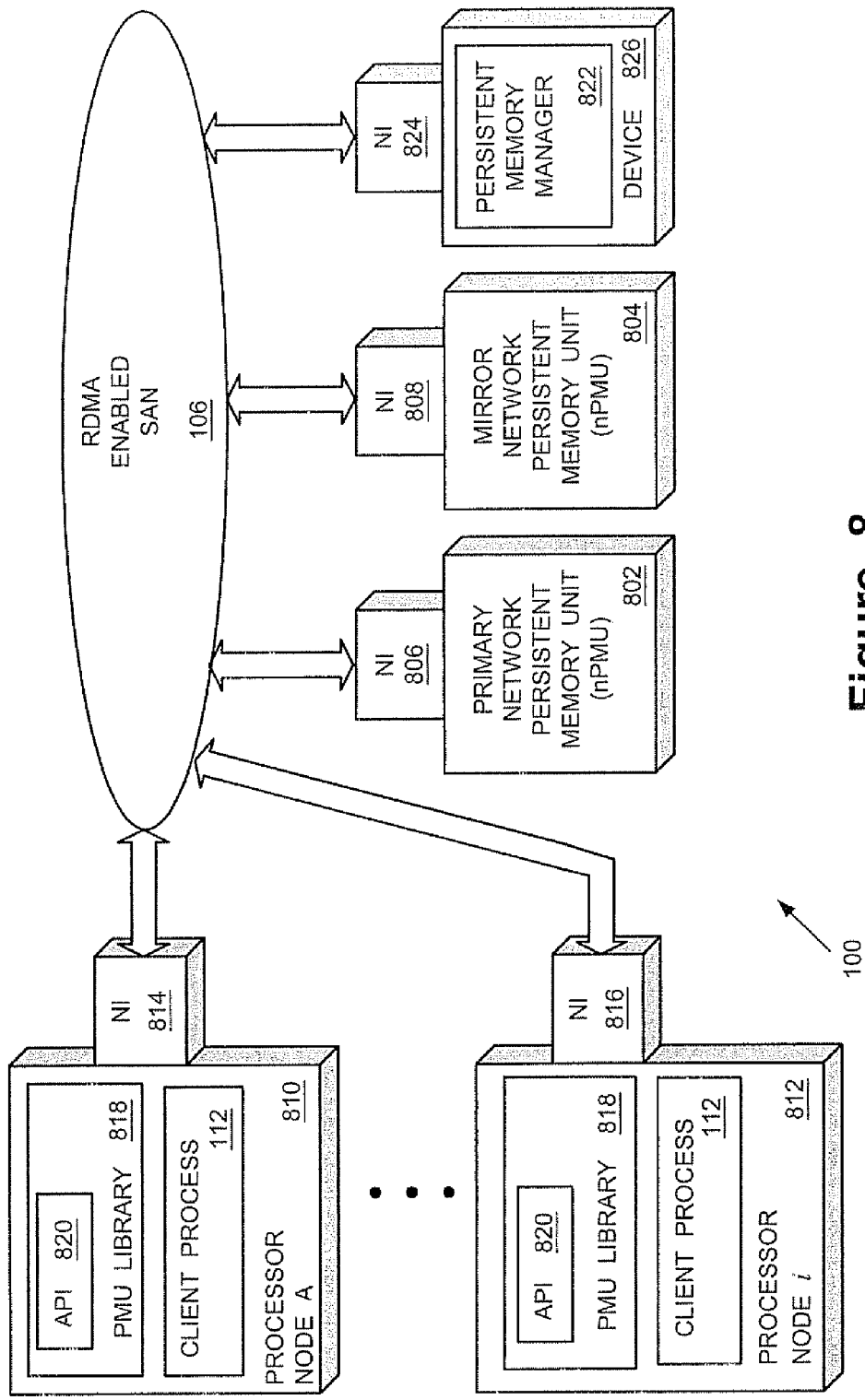
FIG. 8 is a block diagram of an illustrative system with a primary and a mirror network attached persistent memory unit (nPMU).

FIG. 8 is a block diagram of an exemplary persistent memory system 100 with embodiments of a primary network attached persistent memory unit (nPMU) 802 and a mirror nPMU 804. The primary nPMU 802 and the mirror nPMU 804 are communicatively coupled to the RDMA enabled SAN 106 via NIs 806 and 808, respectively. The primary nPMU 802 and the mirror nPMU 804 are separate devices. Accordingly, the primary nPMU 802 and the mirror nPMU 804 have separate fault domains. That is, since there are no shared physical components, a failure (fault) in either of the primary nPMU 802 or the mirror nPMU 804 will not adversely affect the other nPMU, thereby providing a fault-tolerant and redundant persistent memory system.

Figure 11:
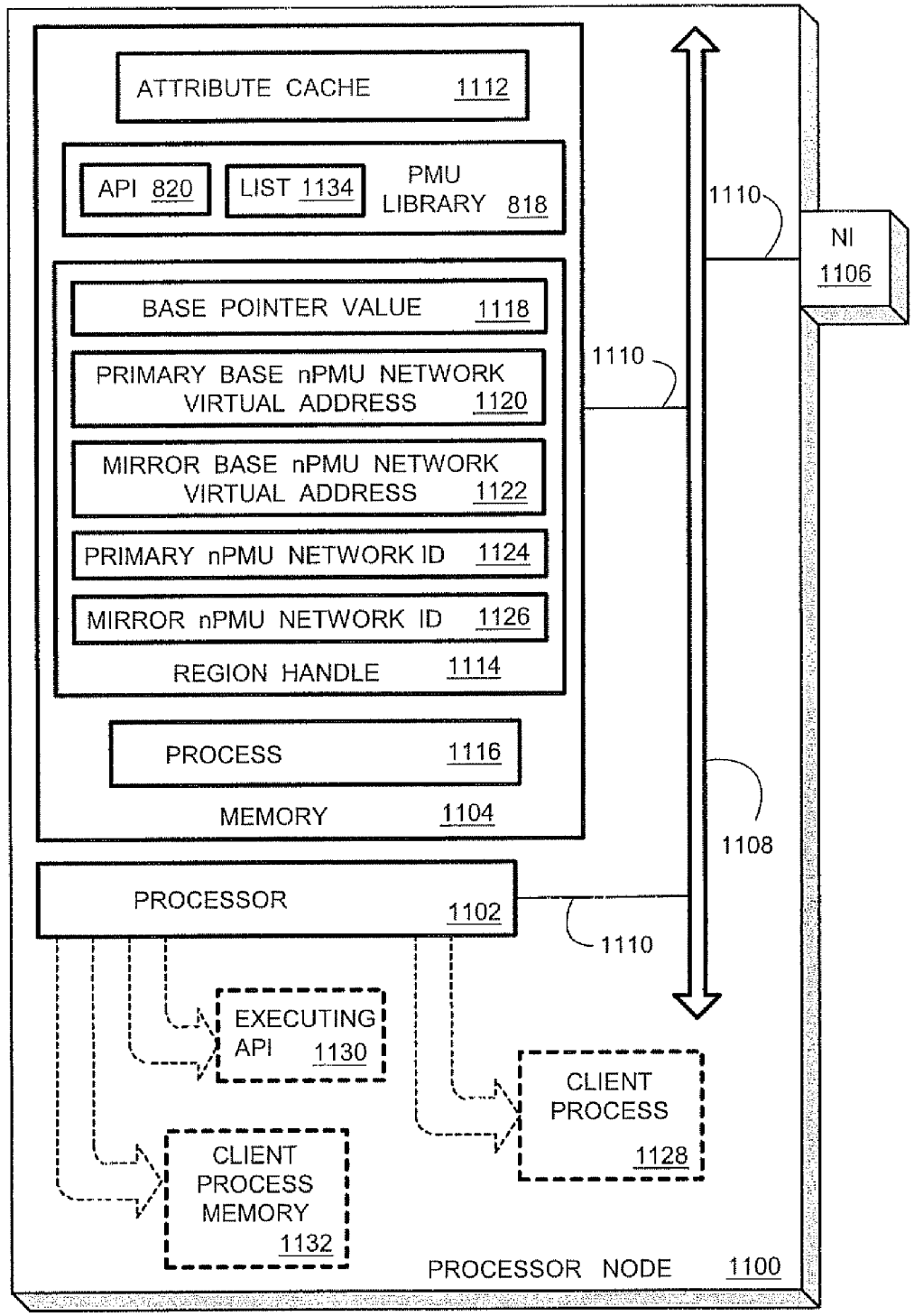
FIG. 11 is a block diagram of an illustrative processor node on which a network attached persistent memory unit (nPMU) is implemented.

A plurality of processor nodes communicate to the primary nPMU 802 and/or the mirror nPMU 804, via the RDMA enabled SAN 106. Thus, processor node A 810 through processor node i 812 are communicatively coupled to the RDMA enabled SAN 106 via NIs 814 and 816, respectively. Each processor node comprises a persistent memory unit (PMU) library 818, implemented as software residing in a memory 1104 (FIG. 11). In one embodiment, the PMU library 818 comprises the application program interface (API) 820 that interfaces between an application running on a processor node and the primary nPMU 802 and/or the mirror nPMU 804. In another embodiment, the API 820 resides as stand-alone software.

The persistent memory manager (PMM) 822 is communicatively coupled to the RDMA enabled SAN 106 via NI 824. As described herein, the PMM 822 responds to an nPMU management function request from a processor node for the use of persistent memory. For convenience of illustration, the PMM 822 is illustrated as residing in device 826. Device 826 is a processor based device for supporting the functions of the PMM 822, described in greater detail herein. In other embodiments, the PMM 822 resides in other convenient locations. For example, the PMM 826 may reside in the primary nPMU 802 or the mirror nPMU 804, or may even reside in a processor node. In another embodiment, PMM 822 is implemented as firmware in a suitable device.

PMM 822 performs management functions for the primary nPMU 802 and the mirror nPMU 804 in response to a request from a processor node. Exemplary management functions include, but are not limited to, creating, deleting, opening, and closing portions of nPMU memory, as well as metadata manipulation operations such as listing what persistent memory regions have been allocated to or deleted from an existing region from the primary nPMU 802 and the mirror nPMU 804. These functions are described in greater detail below.

Figure 9:
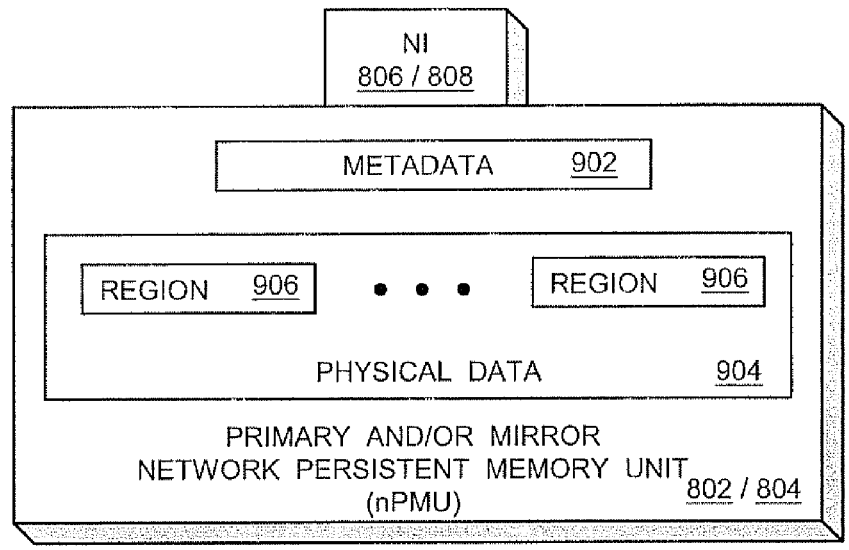
FIG. 9 is a block diagram of an embodiment illustrating additional detail of a primary and/or a mirror network attached persistent memory unit (nPMU).

To enable flexible memory management, the PMM 822 creates mappings from a virtual address space supported in the processor nodes to the physical memory of the primary nPMU 802 and the mirror nPMU 804. These mappings can also be used to enforce access control to nPMU regions 906 (FIG. 9). The nature and/or format of these mappings depends on the interconnection between the processor nodes and the nPMUs 802/804. As a nonlimiting example, with an RDMA style interconnection network, the creation of mappings may involve the creation of translation tables in the nPMUs 802/804 NIs 806/808. In a direct-attached memory scenario, the creation of mappings may involve manipulation of the system's page tables.

FIG. 9 is a block diagram of an embodiment illustrating additional detail of one embodiment of a primary nPMU 802 and/or a mirror nPMU 804. The nPMUs, like all other system components, are subject to failures. Therefore, the nPMUs are managed in pairs, the primary nPMU 802 and the mirror nPMU 804. In one embodiment, each PMM 822 (FIG. 8) is responsible for a single pair of nPMUs 802/804. In alternative embodiments there may be other PMMs managing other nPMU pairs. In yet another embodiment, one PMM 822 may control multiple nPMU pairs.

A portion of the memory of the primary nPMU 802 and the mirror nPMU 804 comprises the metadata 902, also referred to herein as a metadata region wherein information corresponding to the metadata 902 is stored. Metadata 902 describes "what" is on the primary nPMU 802 and/or the mirror nPMU 804. For example, metadata 902 includes, but is not limited to, information identifying allocated nPMU regions 906, base pointer value information and/or identification of the owner and other attributes of each region. The metadata 902 is saved in both the primary nPMU 802 and the mirror nPMU 804. Accordingly, in the event of failure of either the primary nPMU 802 or the mirror nPMU 804, the metadata 902 is preserved. In an alternative embodiment, the metadata 902 also resides in another suitable storage medium.

Another portion of the memory of the primary nPMU 802 and the mirror nPMU 804 comprises the physical data 904. As described in greater detail herein, the PMM creates a region 906 of the physical data 904 in both the primary nPMU 802 and the mirror nPMU 804 on behalf of a PM client. A region 906 residing in the primary nPMU 802 is referred to for convenience as a primary region, and a region 906 residing in the mirror nPMU 804 is referred to for convenience as a mirror region. Accordingly, the term "region 906" is used herein interchangeably to refer to either a primary region or a mirror region. Since the primary nPMU 802 and the mirror nPMU 804 support direct memory access by client processes, data may be directly written into an nPMU memory region 906 by client processes that have opened the region. Furthermore, data residing in an nPMU memory region 906 may also be directly read by client processes that have opened the region.

When a region 906 is created, open, or closed, the operation will affect the region 906 in both the primary nPMU 802 and the mirror nPMU 804, referred to herein as "mirroring" for convenience. Management commands are mirrored by the PMM 822 to the primary nPMU 802 and the mirror nPMU 804. Accordingly, the PMM 822 may recover management information after a failure of either the primary nPMU 802 or the mirror nPMU 804. Therefore, a process will be able to correctly open an exiting region 906.

Figure 10:
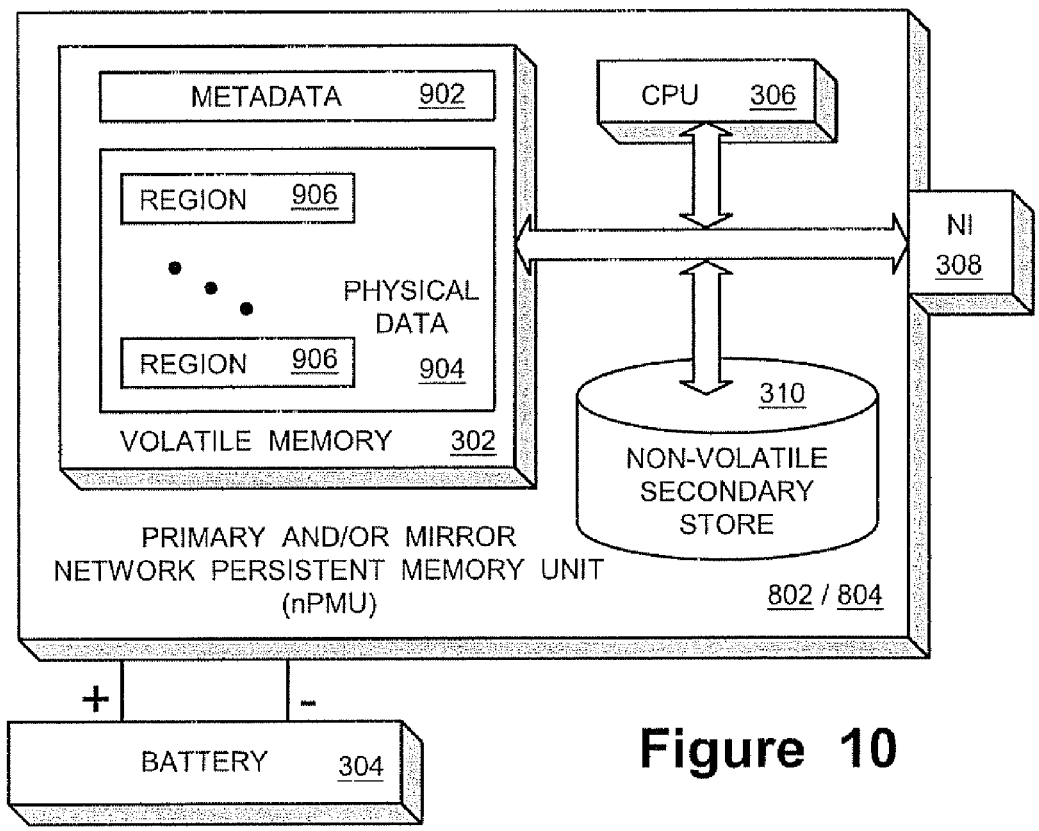
FIG. 10 is a block diagram of another embodiment illustrating additional detail of a primary and/or a mirror network attached persistent memory unit (nPMU) using battery backup.

FIG. 10 is a block diagram of another embodiment illustrating additional detail of a primary and/or a mirror network attached persistent memory unit (nPMU) using battery backup. The above-described volatile memory comprises the metadata 902, physical data 904 and a plurality of regions 906. Other components of this embodiment of a primary nPMU 802 and/or a mirror nPMU 804 are described above, and are illustrated in FIG. 3.

FIG. 11 is a block diagram of an illustrative processor node 1100 (corresponding to the processor node A 810 through processor node i 812, described above and illustrated in FIG. 8) on which the nPMUs 802/804 (FIGS. 8-10) are implemented. Processor node 1100 comprises a processor 1102, a memory 1104 and a NI 1106. Processor 1102, memory 1104 and NI 1106 are communicatively coupled via bus 1108, via connections 1110. In alternative embodiments of processor node 1100, the above-described components are connectivley coupled to each other in a different manner than illustrated in FIG. 11. For example, one or more of the above-described components may be directly coupled to processor 1102 or may be coupled to processor 1102 via intermediary components (not shown).

Memory 1104 comprises PMU library 818, API 820, attribute cache 1112, region handle 1114 and at least one process 1116. Process 1116 may be a program or the like that utilizes memory of the nPMUs 802/804 as described herein. In other embodiments, the above-described elements may reside separately in other suitable memory media.

Region handle 1114 comprises a base pointer value 1118, the primary base network virtual address 1120 at which the region has been mapped in the primary nPMU, the mirror base network virtual address 1122 at which the region has been mapped in the mirror nPMU, a primary nPMU network identifier (ID) 1124 and a mirror nPMU network ID 1126. The primary nPMU ID 1124 and the mirror nPMU ID 1126 correspond to network ID that direct communications between the processor node 1100 and the nPMUs 802/804 (FIG. 8). Region handle 1114 may also comprise an ID for the device 826 where the PMM 822 (FIG. 8) resides. A region handle 1114 (referred to for convenience herein as the parameter "region_handle") is analogous to a file descriptor. A region handle 1114 is passed as a parameter in the functions described below in order to identify and access a region 906 (FIG. 9). A region handle 1114 contains or points to all information needed by the executing API 1130 to specify and access an open region 906 (collectively referred to as access information for convenience).

A region 906 may be described by a plurality of attributes. Region attributes are information about a region 906 of the nPMUs 802/804. Non-limiting examples of region attributes include information indicating region size (referred to for convenience herein as the parameter "region_size"), creation date, etc. The nature of the region attributes will depend on the particular and/or unique requirement of the persistent memory system 100.

The base network virtual address of a region is the starting network virtual address where an nPMU region was mapped when it was open by a client process. This address is only valid as long as a region is open, and it is possible for multiple client processes to share the same network virtual address mapping. The mapping from network virtual address to physical address in the nPMU is managed by the PMM, and it is the responsibility of the PMM to create and destroy these mappings in response to requests from client processes. In embodiments utilizing multiple address space NICs, the base network virtual address may include both a virtual address and an address context identifier (ID), or context handle, specifying a particular range of nPMU network virtual addresses. With multiple address space compatible NICs, there may be many instances of any given nPMU network virtual address. However, the virtual address will be unique for a give context ID. For example, the context ID for a Virtual Interface Architecture based system is referred to as a "memory handle."

The context ID for an Infiniband based system is referred to as an "R_key." When an initiator on the network (i.e., a NI within a client processor) wants to read or write data to a nPMU region, the initiator specifies the location it wishes to access with a network virtual address.

The nPMU base pointer assists a client process 1128 that stores data structures containing pointers. Regions 906 are accessed as a contiguous range of network virtual addresses. In order to prevent client processes from having to know the base nPMU network virtual address (which may be different every time they open a region), the client's pointer value is adjusted to correspond to a range of addresses specified when the region was created. Thus, the region base pointer value 1118 is a value corresponding to the address that a client process will use to access the first byte of an nPMU region 906 (referred to for convenience herein as the parameter "base_pointer"). This base pointer parameter is then used to set a base for offsets used in subsequent read and write commands. Note that the base pointer value may or may not correspond to the base nPMU network virtual address of the region, depending upon the embodiment. Further, the base pointer value 1118 is the same for all client processes using a region, regardless of what CPU the client process resides on. Further, the base pointer value 1118 is specified when a region 906 is created and cannot be later changed. Non-zero base pointer values may be utilized to facilitate the storage of data in regions containing pointers. Therefore, the base pointer value 1118 allows client processes to follow pointers within the nPMU region data. In an alternative embodiment, if a region 906 is to be accessed with zero-based offsets like a file, the base pointer value 1118 would be set to zero.

Processor 1102 retrieves process 1116 and then executes the process 1116, illustrated for convenience as the "client process" 1128 (corresponding to the client process 112 of FIGS. 1 and 8). To facilitate RDMA writes or reads between the active client process memory 1132 of the processor node 1100 and the nPMUs 802/804 (FIG. 8), processor 1102 retrieves API 820 and then executes the API 820, illustrated for convenience as the "executing API" 1130. Accordingly, when the client process desires access to the persistent memory system 100, the executing API 1130 retrieves the region handle 1114 identifying a region 906 of the nPMUs 802/804 that was previously open by the executing process, retrieves at least one region function related to a function required by the executing process, and retrieves at least one parameter associated with the function. These functions and parameters are described in greater detail hereinbelow. This information is formatted as required, and then the access request is communicated to the persistent memory system 100.

It is understood that multiple client processes may be concurrently executing on a processor node. A plurality of executing client processes may access (read/write) to the same regions of an nPMU, and/or access different regions in the same nPMU and/or a different nPMU.

The client process memory 1132 may be a resident memory medium in the processor 1102 and/or an attached memory medium unit(s) such as random access memory (RAM) or the like. It is understood that the client process memory 1132 is illustrated for convenience as the working memory used by processor 1102 to facilitate the operation of the executing client process 1128, and may be any suitable working memory medium.

Figure 12:
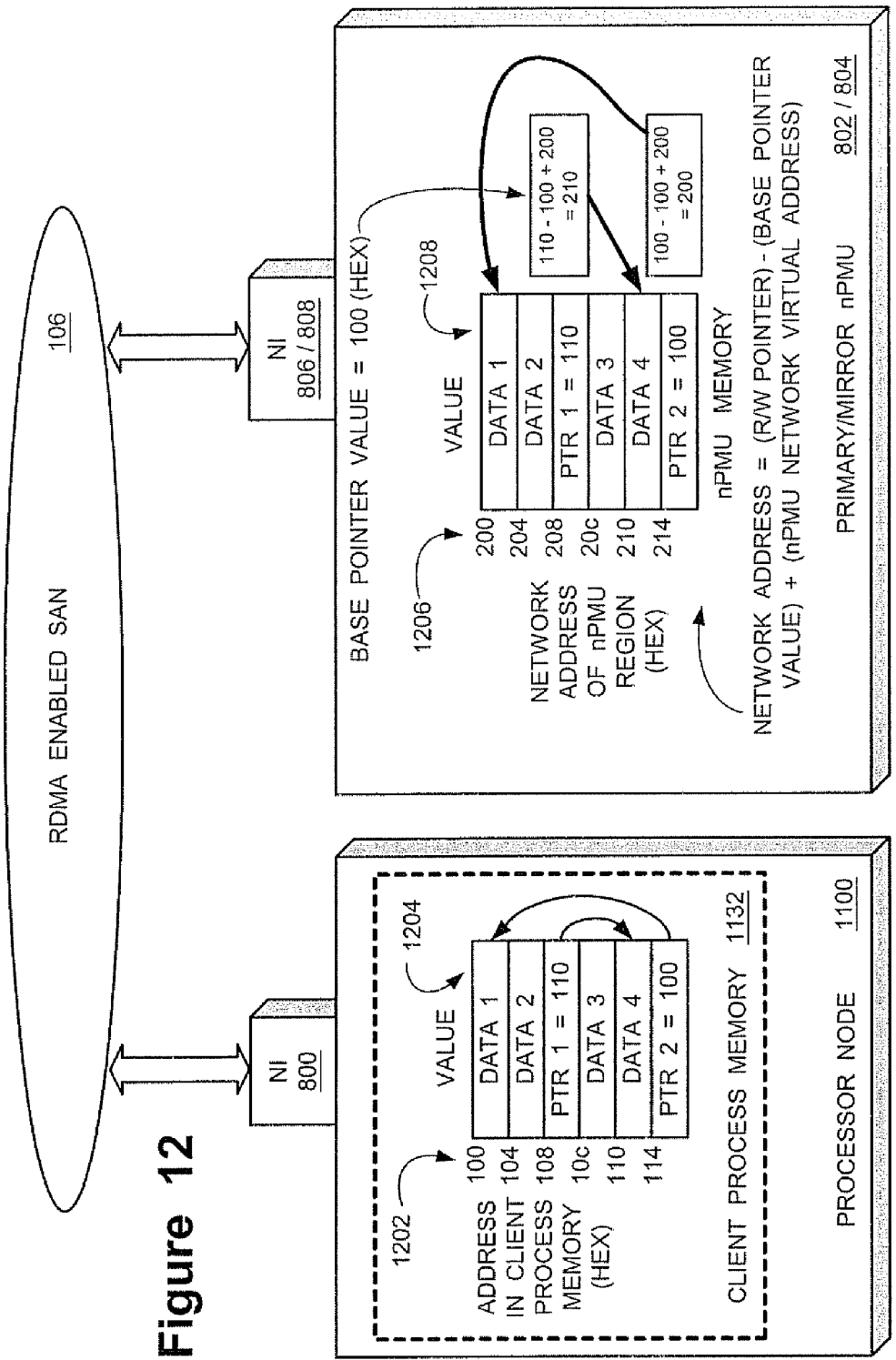
FIG. 12 is a block diagram of an illustrative processor node on which a network attached persistent memory unit (nPMU) is implemented.

FIG. 12 is an illustrative diagram of client addresses 1202 corresponding to the location of information, such as pointers and data, residing in memory bytes 1204 of the client process memory 1132 used by the executing client process 1128 (FIG. 11), and corresponding virtual network addresses 1206 corresponding to the physical location of information, such as pointers and data, residing in memory bytes 1208 of the nPMUs 802/804. As described above, the physical addresses identifying the physical location of the memory bytes 1208 of the nPMUs 802/804 need not necessarily correspond to the network virtual addresses 1206. Also, the regions 909 (FIG.

9) described above are understood to comprise a plurality of physical memory bytes 1208 in the nPMUs 802/804, wherein the number of memory bytes 1208 allocated to a region is determined by the region_size parameter specified when the region 906 is created, as described in greater detail below. For convenience, addresses 1202 and 1206 are represented in a hexadecimal (HEX) system, although any suitable base system may be used.

The execution API 1130 (FIG. 11) provides a mechanism for storing and accessing pointer data within an nPMU region 906 (FIGS. 9 and 10) without the need for data marshalling. If an executing client process 1128 wants to mirror one of its volatile memory-based data structures in an nPMU region 906, and that data structure is stored in contiguous memory at a fixed address, a base pointer value 1118 can be set to the starting address of the data structure. Then, as shown in FIG. 12, pointers within the nPMUs 802/804 resident data structure will work for the executing client process 1128 and for subsequent opens of the region by any other authorized client process. The base pointer calculation shown in FIG. 12 can either be accomplished internal to the read/write verbs, or with a more flexible connection mechanism that supports multiple memory contexts (e.g., VIA, Infiniband, or direct memory-bus attachment), wherein the nPMUs 802/804 can simply map the region's base address to match the value of the base pointer.

In one embodiment, each nPMU pair 802/804 are identified as a volume (referred to for convenience herein as the parameter "pm_volume"). This parameter is roughly analogous to a disk volume. An nPMU volume contains a namespace of nPMU regions 906. In one embodiment, each nPMU volume is controlled by a single PMM 822 and is managed as a single unit of persistent memory. Access to the nPMU volume will be mirrored across the two physical nPMUs 802/804. For convenience, because nPMU volumes are mirrored in the nPMU pair 802/804, a single name, specified in the pm_volume parameter in the verbs listed below, is used to identify a mirrored pair of nPMUs managed by a single PMM. Other embodiments employ other suitable identifiers to identify nPMU pairs.

An nPMU region 906 is an allocated portion of an nPMU volume (i.e., an allocated portion of persistent memory). A specific region is referred to herein by the parameter "region_name" for convenience. In one embodiment, regions 906 are created as mirrored pairs in both the primary nPMU 802 and the mirror nPMU 804, so the same region 906 will be created in both mirror halves. It is understood that the two regions may not necessarily be physically contiguous in their respective nPMUs 802/804. However, the regions 906 are accessed by the client process as if they are contiguous through the use of the network virtual addresses as described herein. Accordingly, regions are mapped in to a contiguous range of network virtual addresses.

When a read or a write occurs between the client process on processor node 1100 and the nPMUs 802/804, or when the client process running on a processor node 1100 requests creation or deletion of a region 906, the executing API 1130 causes execution of a corresponding persistent memory function. The functions are defined in the nPMU library 818. These functions are described in greater detail below.

A "create_region" function is initiated upon a request by the client process on processor node 1100 to create a region 906 of memory in the nPMUs 802/804. When a client process requires a new region of persistent memory, the executing API 1130 generates a communication to the PMM 822 (FIG. 8) requesting creation of a region 906 (FIG. 9). The executing API 1130 obtains the necessary instructions and required parameter list from the nPMU library 818. In one embodiment, the pm_volume parameter (specifying the name of the volume in which the region is to be created), region_name parameter (specifying the name of the persistent memory region), region_size parameter (specifying the size in bytes of the region to be allocated and which may be any value up to the available space in the nPMU), and base_pointer parameter (specifying the base pointer value for the new region) are communicated to the PMM 822 (collectively referred to as region information for convenience). That is, the client process communicates an initial region creation request to the persistent memory system 100 that contains the above-described instructions and required parameter list determined by the executing API 1130.

A region name identifying an nPMU region 906 must be unique within an nPMU volume. Attempting to create another nPMU region with an existing region name will return an error.

The PMM 822 sets up the region 906 for that particular requesting client process, sets the value of the base_pointer, and sets other appropriate attributes in the new region's metadata. The base pointer parameter is used to set a base pointer value 1118 for offsets used in subsequent read and write commands. Accordingly, the executing API 1130 can later access the returned parameter for subsequent functions (such as, but not limited to, writes, reads and deletes). The base pointer of a region 906 is specified when it is created and cannot be later changed.

Creating a region 906 will allocate the requested space for the region 906 in both the primary nPMU 802 and the mirror nPMU 804, along with an entry for the region in the PM metadata 902 (FIG. 9). Once a region 906 has been created, the region 906 can be accessed using the "open_region" function. In other embodiments, the create function may be initiated as needed, such as when a new region is needed by some process running on the persistent memory system 100.

A "delete_region" function is initiated upon a request by a client to permanently terminate access by any client process to a region 906 of memory in the nPMUs 802/804, and free the corresponding nPMU physical memory. In one embodiment, if a client process determines that no process will require direct memory access to a region, the executing API 1130 generates a communication to the PMM 822 (FIG. 8) requesting deletion of the region 906. The executing API 1130 obtains the necessary instructions and required parameter list from the nPMU library 818. In one embodiment, the pm_volume parameter and region_name are communicated to the PMM 822. If the region does not exist within the specified volume, an error will be returned. The "delete_region" function will fail if the region does not exist, if the region is still open by another client process, or if the client process is not authorized. The PMM 822 deletes the identified region 906 in response to the request from that particular client process. Once a region 906 has been deleted, the region 906 can no longer be accessed by any client process using the "open_region" function.

An "open_region" function is initiated upon a request by a client process to open an assigned region 906 of memory in the nPMUs 802/804. The executing API 1130 obtains the necessary instructions and required parameter list from the nPMU library 818. In one embodiment, the pm_volume parameter and region_name are communicated to the PMM 822. The open_region function can only open existing memory regions. If the region 906 does not exist within the specified volume, an error will be returned. The PMM 822 "opens" up the identified region 906 for that particular client process by mapping the physical nPMU pages corresponding to the region to a contiguous range of nPMU virtual addresses. That is, the client process communicates a subsequent access request to the persistent memory system 100 that contains the above-described instructions and required parameter list determined by the executing API 1130.

If the region was successfully opened, the PMM 822 returns the region_size, and the base_pointer value. The PMM 822 will also return the network IDs of the nPMUs containing the region's primary and mirror memory regions, as well as the base network virtual addresses where the regions have been mapped for access by the client process and a memory context handle (for multiple address space networks). Using these returned values, the API will construct a region_handle and save the region handle 1114 in the nPMU library 818 (or in another suitable memory location). Accordingly, subsequent direct accesses to the region 906 by the same client process use this region handle 1114 to identify the region 906.

A "close_region" function is initiated upon a request by the client process to close a region 906 of memory in the nPMUs 802/804. The executing API 1130 obtains the necessary instructions and required parameter list from the nPMU library 818. In one embodiment, the region_handle parameter or other identifying information is communicated to the PMM 822. The close_region function can only close currently open (and therefore existing) memory regions 906. If the region 906 does not exist or is not open by the calling client process within the specified volume, an error will be returned. Closing a region 906 frees any client resources associated with the open region 906. After the region 906 is closed, the client process 1128 may no longer access the region 906 and parameters of the region handle 1114 are invalidated. A close should happen implicitly when a process that has previously opened an nPMU region terminates execution before explicitly closing the nPMU region.

Once a region 906 is open, the "write_region" function is initiated upon a request by the client process to write data or pointers to the region 906 in nPMUs 802/804. The executing API 1130 obtains the necessary instructions and required parameter list from the nPMU library 818. In one embodiment, the region_handle parameter, the buf parameter (specifying the pointer to the buffer where the data that will be written to the region 906 is stored in the client processor's memory), the len parameter (specifying the number of bytes to be written to the region 906), the write_pointer parameter (specifying the address within the region 906 to start writing data) and the mirror parameter (specifying the mirroring method to be used) are communicated to the API 1130. The region 906 logically comprises region_size bytes with addresses ranging from base_pointer to base_pointer +region size. Accordingly, the write_region function will cause the nPMU library to write len bytes to persistent memory from the local client buffer pointed to by buf. In some embodiments this write will be performed directly from the client processor's memory to the nPMUs 802/804 without any intervening copies. The persistent memory write will be to a previously open region specified by region_handle. Data will be written to a contiguous range of region addresses starting at the address specified write_pointer. The addresses within a region range from base_pointer to base_pointer +region_size and may or may not correspond to nPMU virtual or physical addresses. However, if the region addresses are not equivalent to the nPMU virtual addresses where the region has been mapped, the difference between a region address and an nPMU virtual address can be specified as the constant offset (base_pointer)−(network_virtual_address_base). Therefore, data written with a write_pointer value of X will be written to [(nPMU virtual address X)−(base_pointer)−(network_virtual_address_base)].

Similarly, data read with a read_pointer value of X will be read from [(nPMU virtual address X)−(base_pointer)−(network_virtual_address_base)], as described in greater detail hereinbelow. Accordingly, FIG. 12 indicates that:

(Network Address)=[Read/Write (R/W) Pointer]−(Base Pointer Value)+(nPMU Network Virtual Address).

The mirror parameter specifies which half of a mirrored PM volume is to be written (the primary nPMU 802 or the mirror nPMU 804). Under normal circumstances, the mirror parameter should always be PM_BOTH. Other values are only to be used for recovery or when mirroring is not desired. Exemplary valid mirror values are:

PM_BOTH; used for normal operations, the data is written to both the primary and mirror region.
PM_PRIMARY; data is only written to the primary region,
PM_MIRROR; data is only written to the mirror region Once a region 906 is open, the "read_region" function is initiated upon a request by the client process to read data or pointers from the region 906 in nPMUs 802/804. The executing API 1130 obtains the necessary instructions and required parameter list from the nPMU library 818. In one embodiment, the region_handle parameter, the buf parameter (specifying the pointer to the buffer in the client processor in which to place the data that will be read from the region 906), the len parameter (specifying the number of bytes to be read from the region 906), the read_pointer parameter (specifying the address within the region 906 to start reading data) and the mirror parameter (specifying the mirroring method to be used) are communicated to the API 1130. The region 906 is comprised of region_size bytes with addresses ranging from base_pointer to base_pointer+region size. Accordingly, the read_region function will cause the API 1130 to read len bytes from persistent memory, starting at location read_pointer, to the local client buffer pointed to by buf. In some embodiments the data will be read directly from one of the nPMUs 802/804 to the client memory without any intervening copies. The addresses within a region range from base_pointer to base_pointer+region_size and may or may not correspond to nPMU virtual or physical addresses. However, if the region addresses are not equivalent to the nPMU virtual addresses where the region 906 has been mapped, the difference between a region address and an nPMU virtual address can be specified as the constant offset base_pointer−network_virtual_address_base. Therefore, data read with a read_pointer value of X will actually be read from nPMU virtual address X−(base_pointer−network_virtual_address_base).

The mirror parameter specifies which half of a mirrored PM volume is to be read (the primary nPMU 802 or the mirror nPMU 804). Under normal circumstances, the mirror parameter should always be PM_ANY. Other values are only to be used for recovery or when mirroring is not desired. Exemplary valid mirror values are:

PM_ANY; used for normal operations, the data is read from either the primary or the mirror region.
PM_PRIMARY; data is only read from the primary region,
PM_MIRROR; data is only read from the mirror region.

In one embodiment, when the read request specifies that the information stored in the persistent memory system 100 is to be retrieved from either the primary nPMU 802 or the mirror nPMU 804 (mirror=PM_ANY), a determination is made whether the information is available in the primary nPMU 802. If the information is not available in the primary nPMU 804, the information is retrieved from the mirror nPMU 804. This process is transparent to the executing client process 1128. For example, the primary nPMU 804 may have failed, a portion of the primary nPMU 804 memory space may be bad or otherwise inoperative, or a communication link providing access to the primary nPMU 802 may have failed.

Similarly, if the request specifies that the information stored in the persistent memory system 100 is to be retrieved from either the primary nPMU 802 or the mirror nPMU 804 (mirror=PM_ANY), and the persistent memory system wishes to obtain the information from the mirror nPMU 804, perhaps for performance reasons, a determination is made whether the information is available in the mirror nPMU 804. If the information is not available in mirror nPMU 804, the information is retrieved from the primary nPMU 802.

In one embodiment, when the read request specifies that the information stored in the persistent memory system 100 is to be retrieved from only the primary nPMU 802 (mirror=PM_PRIMARY), a determination is made whether the information is available in the primary nPMU 802. If the information is not available in the primary nPMU 802, the request will fail and return an error.

Similarly, when the read request specifies that the information stored in the persistent memory system 100 is to be retrieved from only the mirror nPMU 802 (mirror=PM_MIRROR), a determination is made whether the information is available in the mirror nPMU 804. If the information is not available in the mirror nPMU 804, the request will fail and return an error.

The "list_regions" function will get a list 1134 (FIG. 11) of regions within the volume named in pm_volume. The list 1134 is returned in a user-allocated array of string variables. The list 1134 will be filled in until the list 1134 is full or until all regions have been listed. The actual number of regions in a volume will be returned in a region_cnt parameter (specifying the number of regions in the volume). The executing API 1130 obtains the necessary instructions and required parameters from the list 1134 in the nPMU library 818. In one embodiment, the pm_volume parameter (specifying the name of the volume whose contents are to be examined), the region_list parameter (specifying the pointer to an array of pointers for the list of regions within a volume) and the list_size parameter (specifying the number of elements in the region_list array). The list size may be as long as desired. The actual number of regions in the volume, and/or other related information (collectively referred to as list information for convenience), will be returned in region_cnt. If list_size is more than region_cnt, only region_cnt entries will be filled in by list_regions. If list_size is less than region_cnt, the entire region_list array will be filled.

In one embodiment, client processes may read attributes of existing persistent memory regions. These attributes can include indicia corresponding to such parameters as region size, region base pointer, creation time, last open time, etc. A client process must first request a "read" of the attributes (collectively referred to as attribute information for convenience). A copy of the attribute structure is communicated from the PMM 822, after the PMM 822 processes the metadata 902 (FIG. 9), to the requesting client process. Then, the actual attribute values can be accessed using an attribute accessor function as described below.

The "read attributes" accessor function, called an attribute request for convenience, requests the attribute information for the specified region 906 from the PMM 822. The executing API 1130 obtains the necessary instructions and required parameter list from the nPMU library 818. In one embodiment, the pm_volume parameter (specifying the name of the volume whose contents are to be examined), and the region_name parameter (specifying the name of the region of interest) are communicated to the PMM 822. Since it is not required that the client communicate with the PMM 822 for each attribute element, read_attributes caches the attribute data at the time of the function call. The attributes are stored in the attribute cache 1112 (FIG. 11) whose memory location is indicated by the attr_handle parameter returned by the read_attributes function. Accordingly, subsequent attribute changes of the nPMU 802/804 will not be reflected until the read_attributes function is called again.

The "get attr<datatype>" accessor function reads attribute values from the attribute cache structure pointed to by attr_handle. These attributes are specified by a character name and the value returned will be of the data type specific to an accessor function. The executing API 1130 obtains the necessary instructions and required parameter list from the nPMU library 818. In one embodiment, the attr_handle parameter (specifying a pointer to the structure containing the cached attributes for the specified region at the time the read_region_attribs was executed), and an optional max_string_len parameter are communicated to the API 1130. The max_string_len parameter applies to the string accessor and is the size of the string pointed to by attr_val. When reading a string attribute, up to max_string_len characters will be copied into the buffer pointed to by attr_val. If the size of attr_val is inadequate to store the entire attribute, the first max_string_len characters will be copied and an error will be returned. The attr_val parameter (specifying the value of the attribute named by attr_name) is returned. The type of this parameter is specified by which accessor function is used (i.e., <data type>). Note that the client process must allocate the space for the attribute value. In addition, if the wrong accessor function is called for a particular attribute (i.e., if the unsigned 16-bit accessor is called for a 64-bit attribute) an error will be returned.

The "free region attrs" function frees any resources associated with the attribute cache 1112 structure pointed to by attr_handle. After this function has been called the attribute_handle will no longer be valid. The executing API 1130 obtains the necessary instructions and required parameter list from the nPMU library 818.

Figure 13:
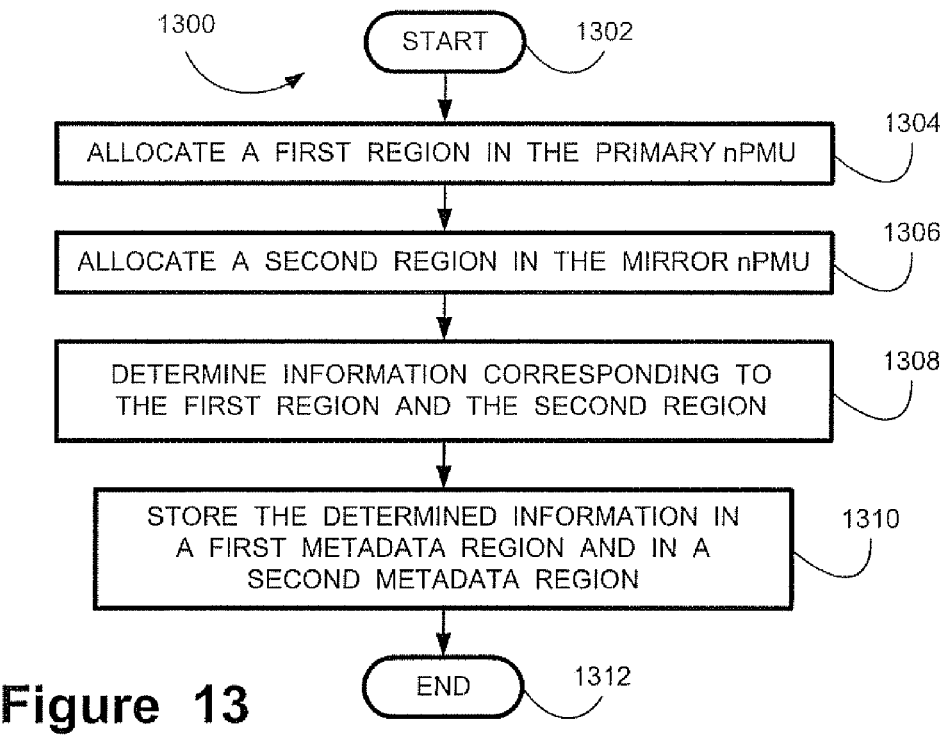
FIG. 13 is a flowchart illustrating a process used by an embodiment of the persistent memory system to create a persistent memory region.
Figure 14:
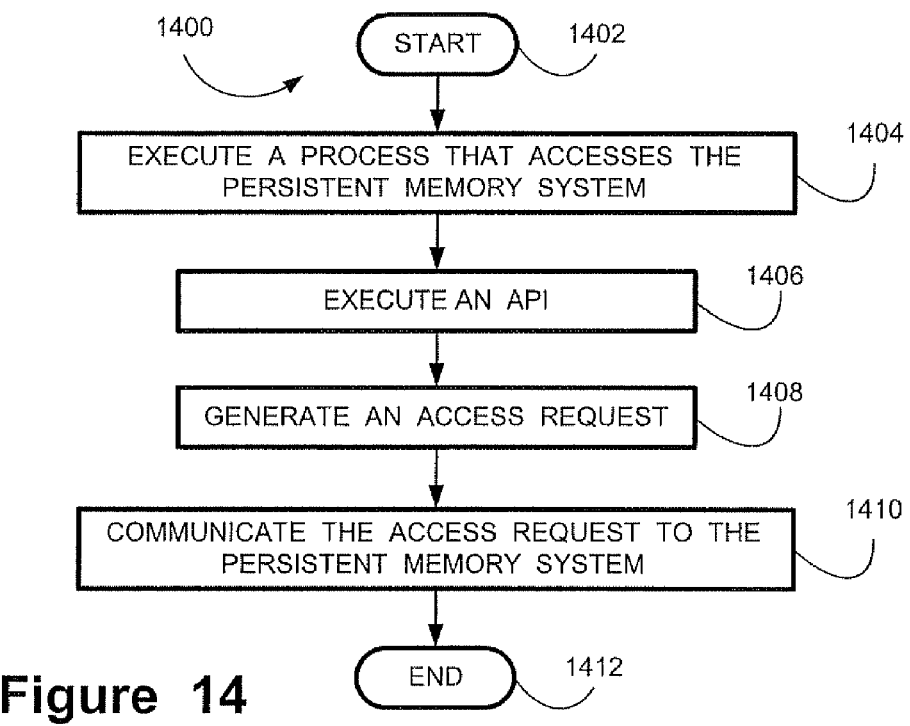
FIG. 14 is a flowchart illustrating a process used by a client process to access the persistent memory system.

FIG. 13 is a flowchart 1300 illustrating a process used by an embodiment of the persistent memory system 100 to create a persistent memory region. FIG. 14 is a flowchart 1400 illustrating a process used (FIG. 11) by a client process to access the persistent memory system 100. The flow charts 1300 and 1400 of FIGS. 13 and 14, respectively, shows the architecture, functionality, and operation of an embodiment for implementing logic to access a persistent memory system 100. An alternative embodiment implements the logic of flow charts 1300 and 1400 with hardware configured as a state machine. In this regard, each block may represent a module, segment or portion of code, which comprises one or more executable instructions for implementing the specified logical function(s). It should also be noted that in some alternative implementations, the functions noted in the blocks may occur out of the order noted in FIGS. 13 and 14, or may include additional functions, without departing from the functionality of the persistent memory system 100. For example, two blocks shown in succession in FIGS. 13 and 14 may in fact be substantially executed concurrently, the blocks may sometimes be executed in the reverse order, or some of the blocks may not be executed in all instances, depending upon the functionality involved, as will be further clarified hereinbelow.

The process of creating a PM region is illustrated in FIG. 13 starts at block 1302. At block 1304, a first region in the primary nPMU is allocated, the first region corresponding to a portion of memory in the primary nPMU. At block 1306, a second region in the mirror nPMU is allocated, the second region corresponding to a portion of memory in the mirror nPMU. At block 1308, information corresponding to the first region and the second region is determined. At block 1310, the determined information is stored in a first metadata region in the primary nPMU and is stored in a second metadata region in the mirror nPMU. The process ends at block 1312.

The process illustrated in FIG. 14 starts at block 1402. At block 1404, a process that accesses the persistent memory system is executed. At block 1406, an application process interface (API) is executed, the API retrieving a region handle identifying a first region in a primary nPMU and identifying a second region in a mirror nPMU assigned to the client process node, retrieving at least one region function related to a function required by the executing process, and retrieving at least one parameter associated with the function. At block 1408, an access request comprising the region handle, the region function and the parameter is generated. At block 1410, the access request is communicated to the persistent memory system. The process ends at block 1412.

While various embodiments and advantages have been described, it will be recognized that a number of variations will be readily apparent. For example, in implementing persistent memory, many technologies are available. Thus, the present approach may be widely applied consistent with the disclosure herein and the claims which follow.

What is claimed is:

1. A client processor node comprising;
    a processor;
    a network interface communicatively coupled to a primary network persistent memory unit (nPMU), a mirror nPMU and a persistent memory manager (PMM) via a communication system; and
    a memory, the memory further comprising:
    a process that accesses a primary region corresponding to a predefined portion of the primary nPMU and that accesses a mirror region corresponding to a predefined portion of the mirror nPMU when the process is executed by the processor; and
    a persistent memory unit (PMU) library, wherein the PMU library comprises at least a first function configured to permit the process to directly write information to the primary region and to directly write information to the mirror region, and a second function configured to permit the process to directly read the information from a selected one of the primary region or the mirror region, wherein the PMU library provides functions and at least one parameter list for each function, the at least one parameter list comprising a list of parameters required for the associated function to execute.

2. The client processor node of claim 1, further comprising an application program interface (API) residing in the memory, wherein the API, when the API is executed by the processor, causes the client processor node to access the functions of the PMU library so that the process accesses the primary region and the mirror region.

3. The client processor node of claim 1, further comprising an attribute cache residing in the memory and corresponding to at least some access information in metadata, wherein the metadata identifies at least the primary region and the mirror region assigned to the client process.

4. A method , comprising:
    allocating a first region in a primary network persistent memory unit (nPMU) via a nPMU library, the first region corresponding to a portion of memory in the primary nPMU the nPMU library providing functions and at least one ammeter list for each function the at least one parameter list comprising a list of parameters required for the associated function to execute;
    allocating a second region in a mirror nPMU, the second region corresponding to a portion of memory in the mirror nPMU;
    determining region information corresponding to the first region and the second region; and
    storing the determined region information as metadata in a first metadata region in the primary nPMU and in a second metadata region in the mirror nPMU by directly writing to the primary nPMU and directly writing to the mirror nPMU, respectively.

5. The method of claim 4, further comprising:
    receiving an initial request from a client process for access to the persistent memory; and
    creating the first region and the second region, before the allocating, determining and storing are performed.

6. The method of claim 4, further comprising:
    receiving a subsequent request from a client process for access to the persistent memory; and
    opening the first region and the second region.

7. The method of claim 4, further comprising communicating a base pointer value to the client process.

8. The method of claim 4, further comprising communicating a region size parameter to the client process.

9. The method of claim 4, further comprising:
    receiving a write request communicated from the client process to the persistent memory system;
    receiving information that is to be stored in the persistent memory system;
    storing the information in the first region; and
    storing the information in the second region.

10. The method of claim 4, further comprising:
    receiving a read request communicated from the client process to the persistent memory system;
    retrieving information that is stored in the persistent memory system based upon the region information specifying at least one virtual address corresponding to a first physical address where the information is stored in the first region and corresponding to a second physical address where the information is stored in the second region;
    communicating the retrieved information from the persistent memory system to the client process.

11. The method of claim 10, further comprising:
    receiving a mirror parameter in the read request, the mirror parameter specifying that the information is to be retrieved from the first region; and
    retrieving the information from the first region.

12. The method of claim 11, further comprising:
    determining if the information is available from the first region; and
    retrieving the information from the second region when the information is not available from the first region.

13. The method of claim 10, further comprising:
    receiving a mirror parameter in the read request, the mirror parameter specifying that the information is to be retrieved from the second region; and
    retrieving the information from the second region.

14. The method of claim 13, further comprising:
    determining if the information is available from the second region; and
    retrieving the information from the first region when the information is not available from the second region.

15. The method of claim 6, further comprising:
receiving a request from the client process to end access to the persistent memory system; and
closing the first region and the second region.

16. The method of claim 4, further comprising:
receiving a subsequent request from a client process to permanently terminate access to the persistent memory system; and
deleting the first region and the second region.

17. The method of claim 4, further comprising:
receiving a request from a client process to receive access information corresponding to at least part of the metadata;
retrieving the requested access information from a selected one of the first metadata region in the primary nPMU and the second metadata region in the mirror nPMU; and
communicating the retrieved access information to the client process.

18. The method of claim 4, further comprising:
receiving a request for list information corresponding a plurality of regions in the primary nPMU and the mirror nPMU;
retrieving the requested list information from a selected one of the first metadata region in the primary nPMU and the second metadata region in the mirror nPMU; and
communicating the list information corresponding to the regions.

19. A system for accessing a persistent memory system, comprising:
means for receiving an initial request from a client process for access to the persistent memory system;
means for allocating a first region in a primary network persistent memory unit (nPMU) via a nPMU library, the first region corresponding to a portion of memory in the primary nPMU, the nPMU library providing functions and at least one parameter list for each function, the at least one parameter list comprising a list of parameters rewired for the associated function to execute;
means for allocating a second region in a mirror nPMU, the second region corresponding to a portion of memory in the mirror nPMU;
means for determining region information corresponding to the first region and the second region; and
means for storing the determined region information in a first metadata region in the primary nPMU and in a second metadata region in the mirror nPMU by directly writing to the primary nPMU and directly writing to the mirror nPMU, respectively.

20. The system of claim 19, further comprising:
means for receiving a subsequent request from the client process for access to the persistent memory system; and
means for opening the first region and the second region.

21. The system of claim 20, further comprising:
means for receiving a write request communicated from the client process to the persistent memory system;
means for receiving information that is to be stored in the persistent memory system;
means for storing the information in the first region; and
means for storing the information in the second region.

22. The system of claim 20, further comprising:
means for receiving a read request communicated from the client process to the persistent memory system;
access means for retrieving information that is stored in the persistent memory system based upon the region information in the read request specifying a region name corresponding to the first region and the second region, a base pointer value corresponding to a virtual address of the first region and the second region, a read pointer parameter corresponding to another virtual address where reading the information is to start, and a length parameter corresponding to an amount of information to be read;
means for communicating the retrieved information from the persistent memory system to the client process.

23. A non-transitory computer-readable medium having a program for accessing a persistent memory system, the program comprising logic configured to perform:
receiving an initial access request from a client process requesting access to the persistent memory system;
allocating a first region in a primary network persistent memory unit (nPMU) via a nPMU library, the first region corresponding to a portion of memory in the primary nPMU, the nPMU library providing functions and at least one parameter list for each function, the at least one parameter list comprising a list of parameters required for the associated function to execute;
allocating a second region in a mirror nPMU, the second region corresponding to a portion of memory in the mirror nPMU;
determining access information corresponding to the first region and the second region; and
storing the determined access information in a first metadata region in the primary nPMU and in a second metadata region in the mirror nPMU by directly writing to the primary nPMU and directly writing to the mirror nPMU, respectively.

* * * * *